(12) United States Patent
Ely et al.

(10) Patent No.: US 6,667,740 B2
(45) Date of Patent: Dec. 23, 2003

(54) POSITION SENSOR

(75) Inventors: David T. Ely, Cambridgeshire (GB); Ian P. Collins, Cambridgeshire (GB); Peter D. Cauwood, Cambridgeshire (GB); Steven R. Brace, Cambridgeshire (GB)

(73) Assignee: Synaptics (UK) Limited, Cambridgeshire (GB)

( * ) Notice: Subject to any disclaimer, the term of this patent is extended or adjusted under 35 U.S.C. 154(b) by 74 days.

(21) Appl. No.: 09/754,218

(22) Filed: Jan. 5, 2001

(65) Prior Publication Data

US 2001/0001430 A1 May 24, 2001

Related U.S. Application Data

(63) Continuation of application No. PCT/GB99/03989, filed on Nov. 29, 1999.

(51) Int. Cl.[7] ................................................. G09G 5/00
(52) U.S. Cl. .................... 345/179; 345/173; 178/19.03; 178/19.04
(58) Field of Search .............................. 345/179, 173; 178/19.03, 19.02, 18.02, 19.01

(56) References Cited

U.S. PATENT DOCUMENTS

| 3,873,770 | A | * | 3/1975 | Ioannou | 178/18.02 |
|---|---|---|---|---|---|
| 4,577,057 | A | | 3/1986 | Blesser | |
| 4,697,144 | A | | 9/1987 | Howbrook | |
| 4,704,501 | A | | 11/1987 | Taguchi et al. | |
| 5,134,689 | A | * | 7/1992 | Murakami et al. | 345/443 |
| 5,136,125 | A | | 8/1992 | Russell | |
| 5,342,136 | A | * | 8/1994 | Fukami | 401/135 |
| 5,461,204 | A | * | 10/1995 | Makinwa et al. | 178/19.03 |
| 5,818,431 | A | * | 10/1998 | Oh et al. | 345/179 |
| 5,864,098 | A | * | 1/1999 | Shinohe | 178/19.01 |
| 5,895,895 | A | * | 4/1999 | Ono et al. | 178/19.03 |

FOREIGN PATENT DOCUMENTS

| EP | 0 218 745 | 4/1987 |
|---|---|---|
| EP | 0 537 458 | 4/1993 |
| EP | 0 680 009 | 11/1995 |
| EP | 0 716 390 | 6/1996 |
| EP | 0 772 149 | 5/1997 |

* cited by examiner

*Primary Examiner*—Steven Saras
*Assistant Examiner*—Fritz Alphonse
(74) *Attorney, Agent, or Firm*—Nixon & Vanderhye P.C.

(57) ABSTRACT

A low cost x-y digitising system is provided for use in consumer electronic devices, such as portable digital assistants, mobile telephones, web browsers and the like. The digitiser includes a resonant stylus, an excitation winding for energising the resonant stylus and a set of sensor windings for sensing the signal generated by the stylus, from which the x-y position of the stylus is determined.

37 Claims, 25 Drawing Sheets

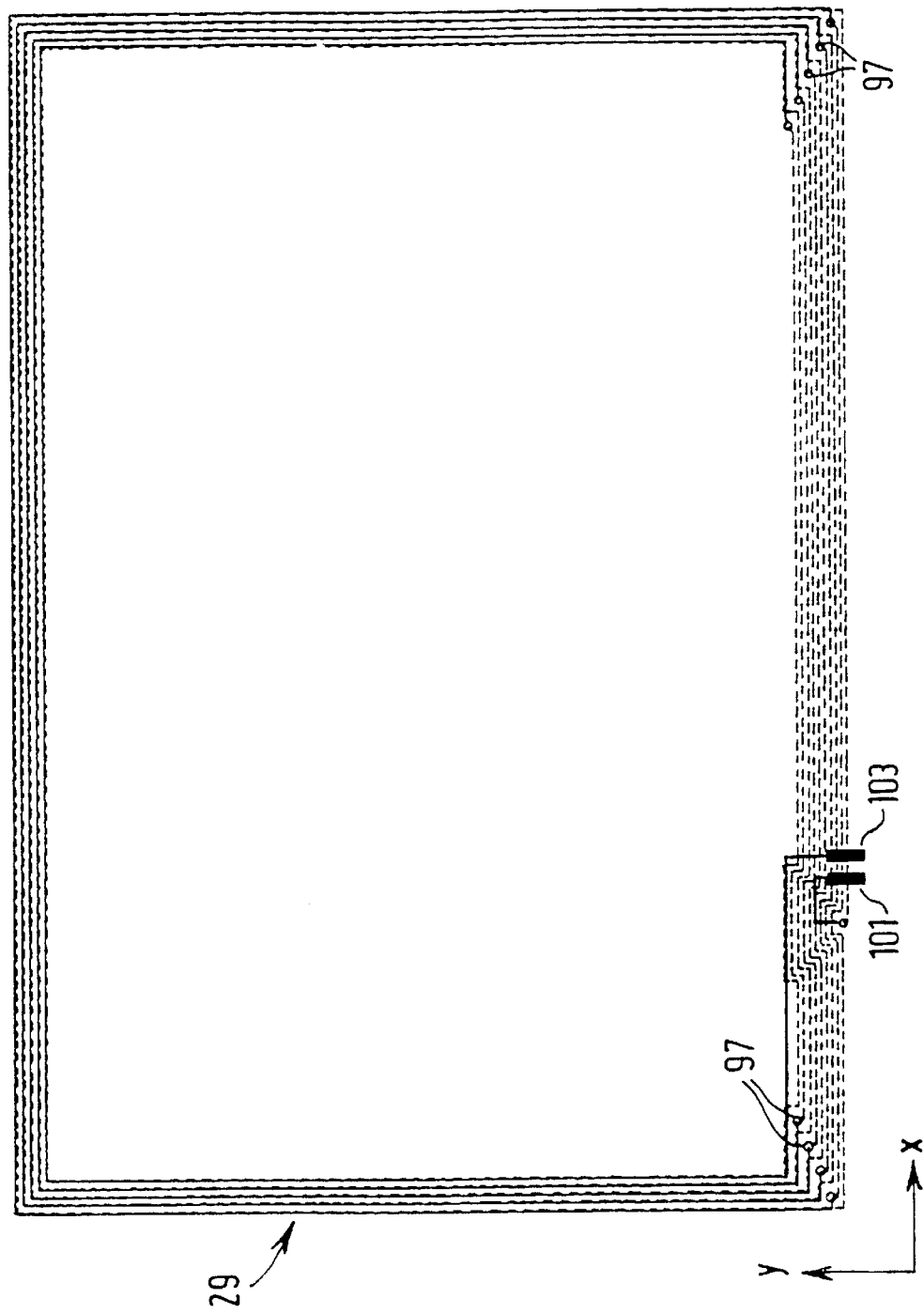

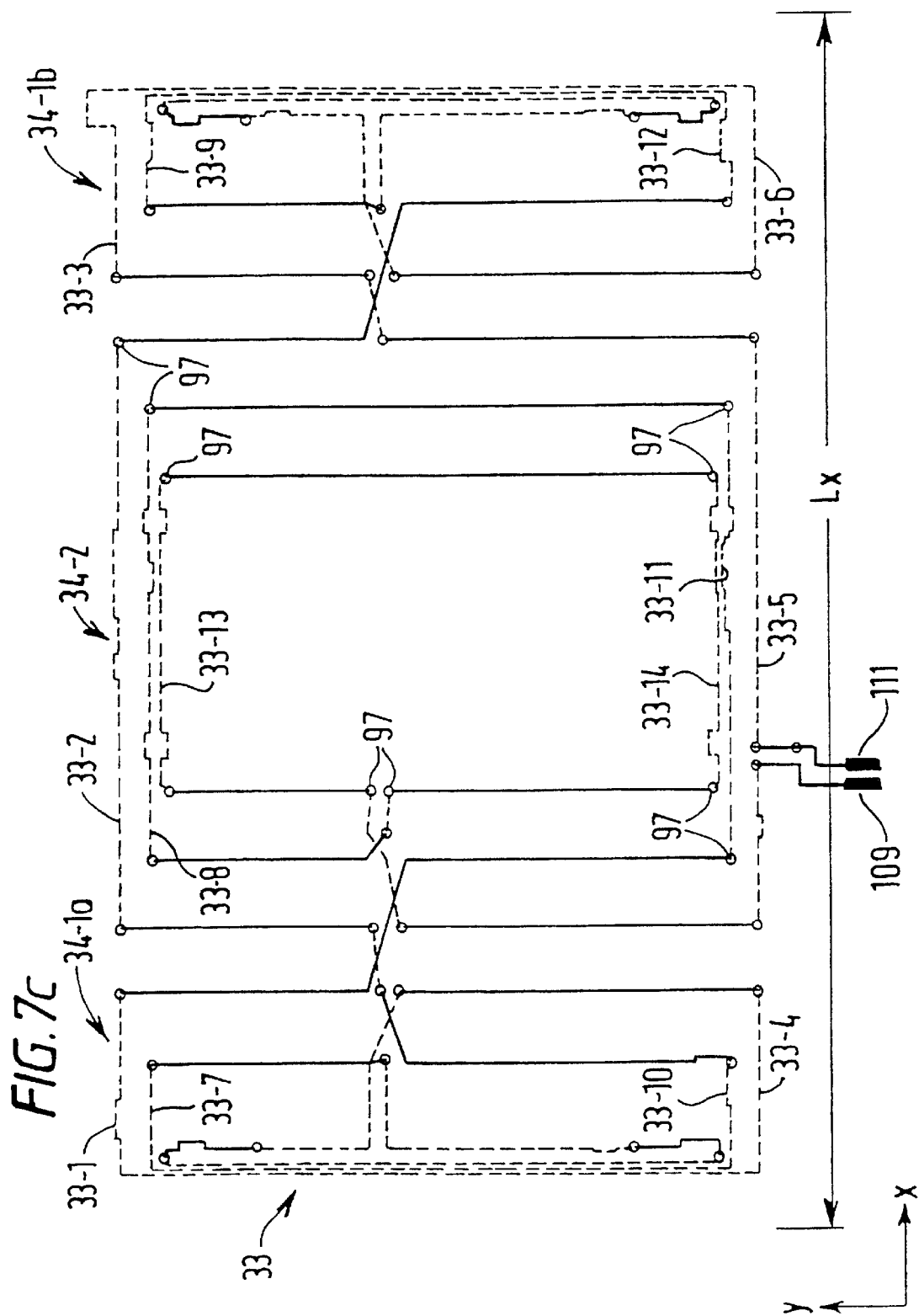

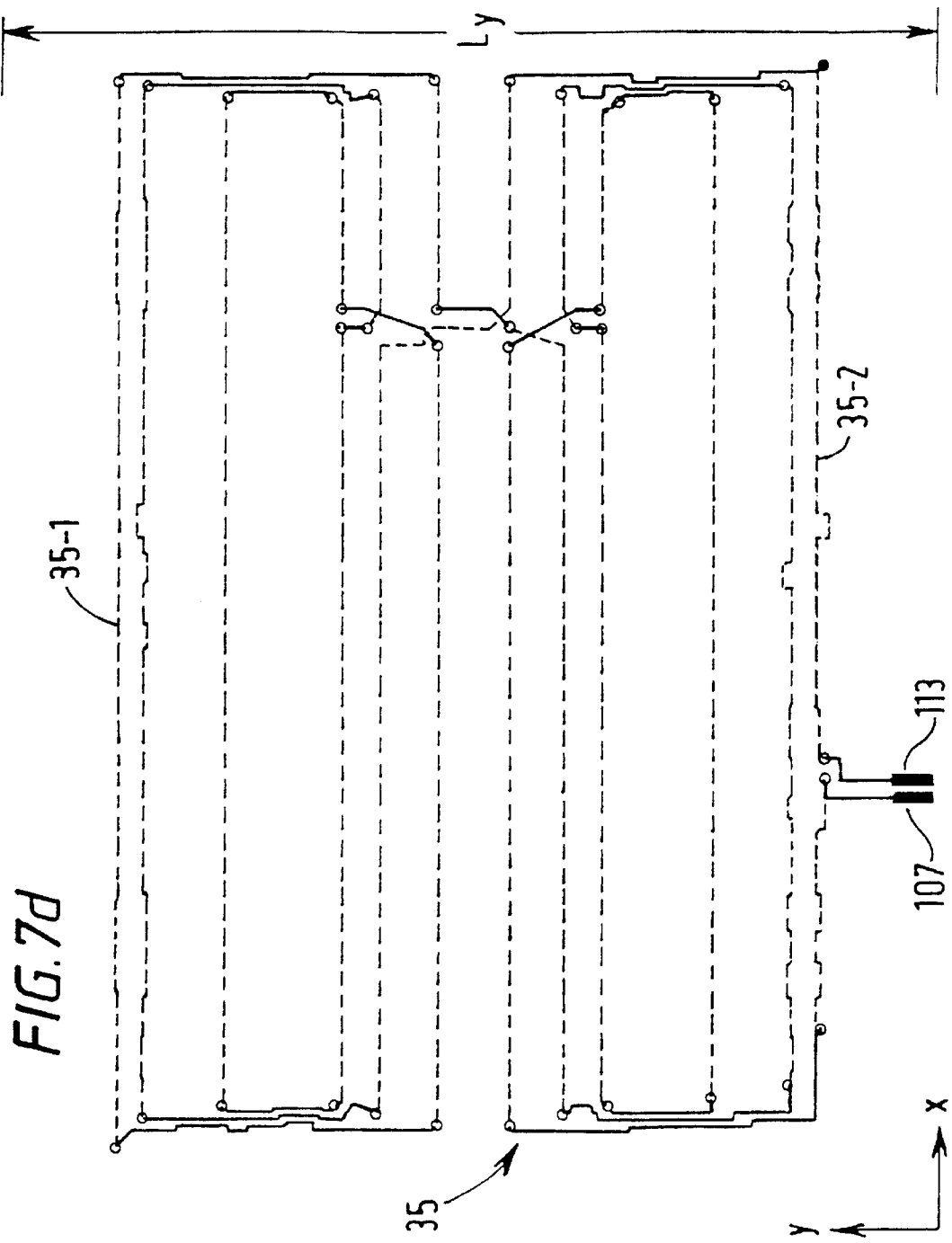

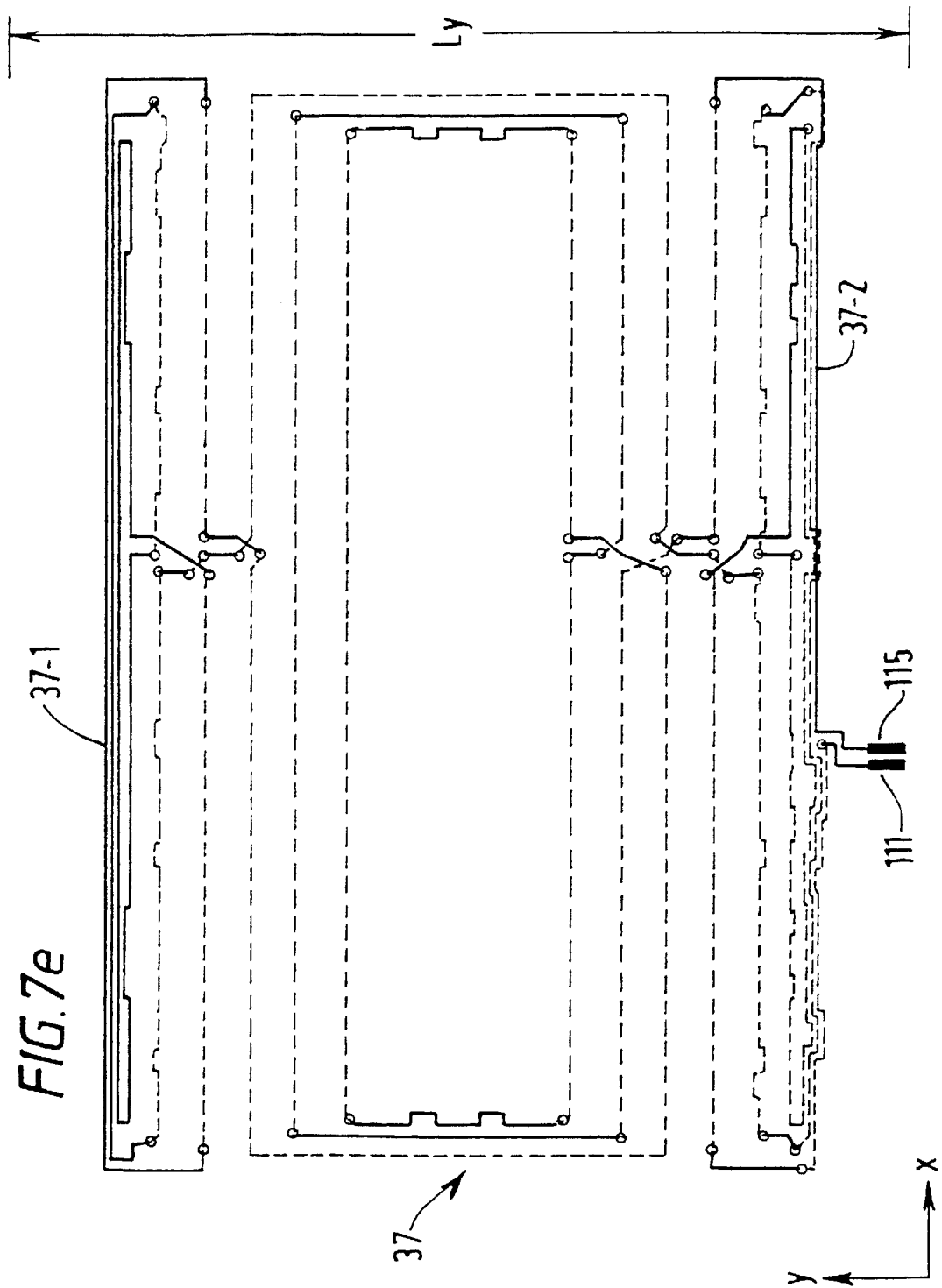

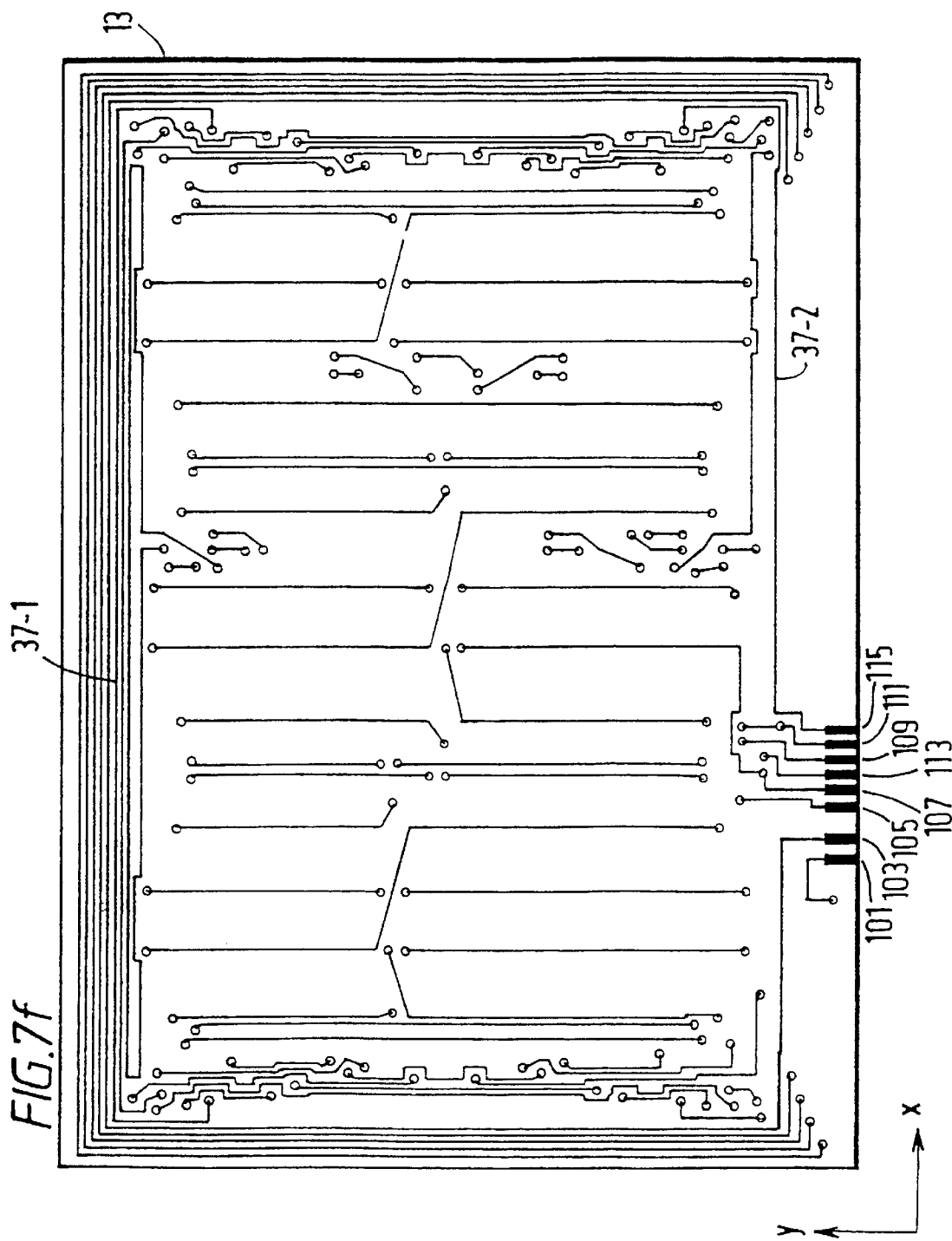

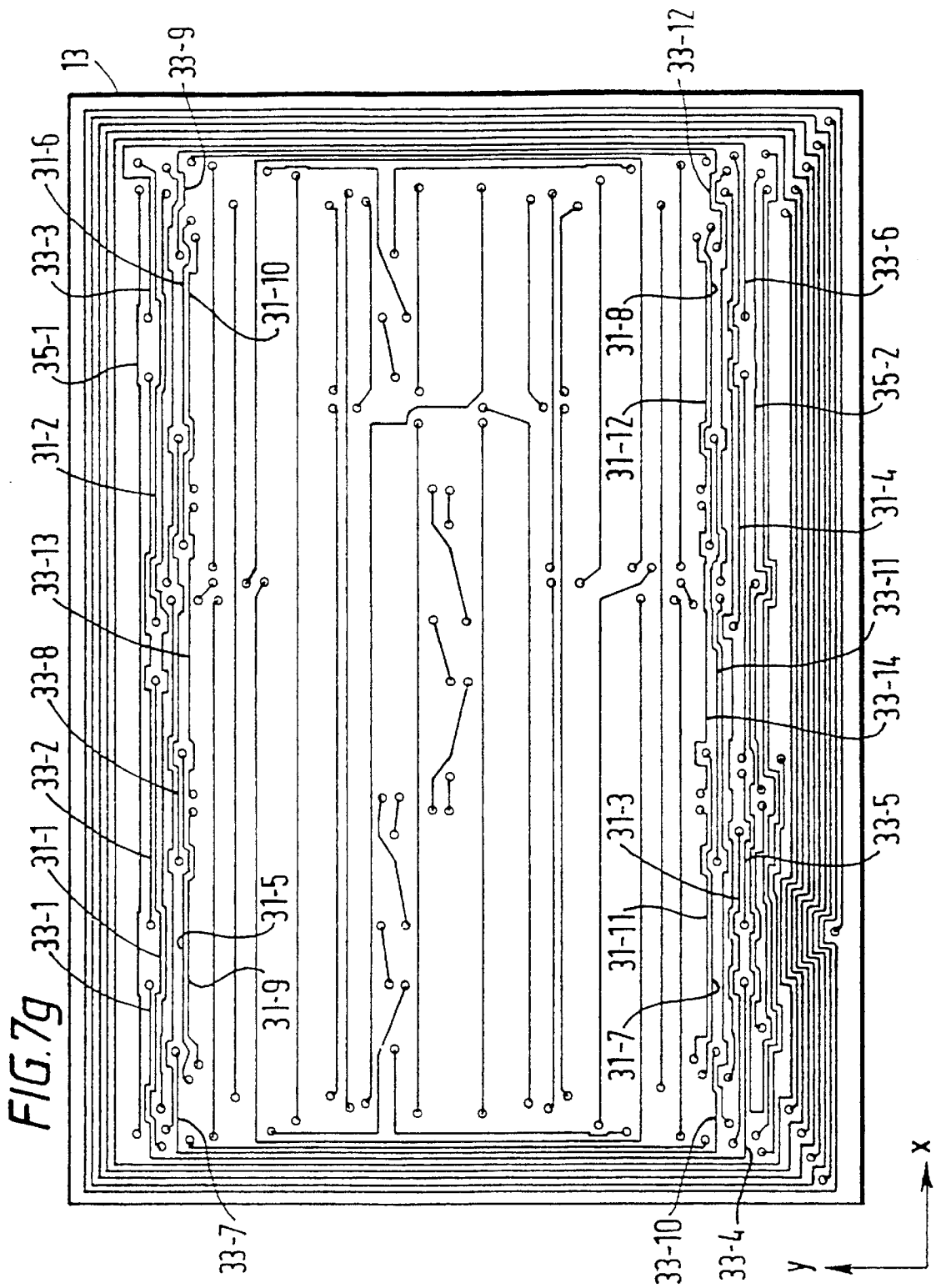

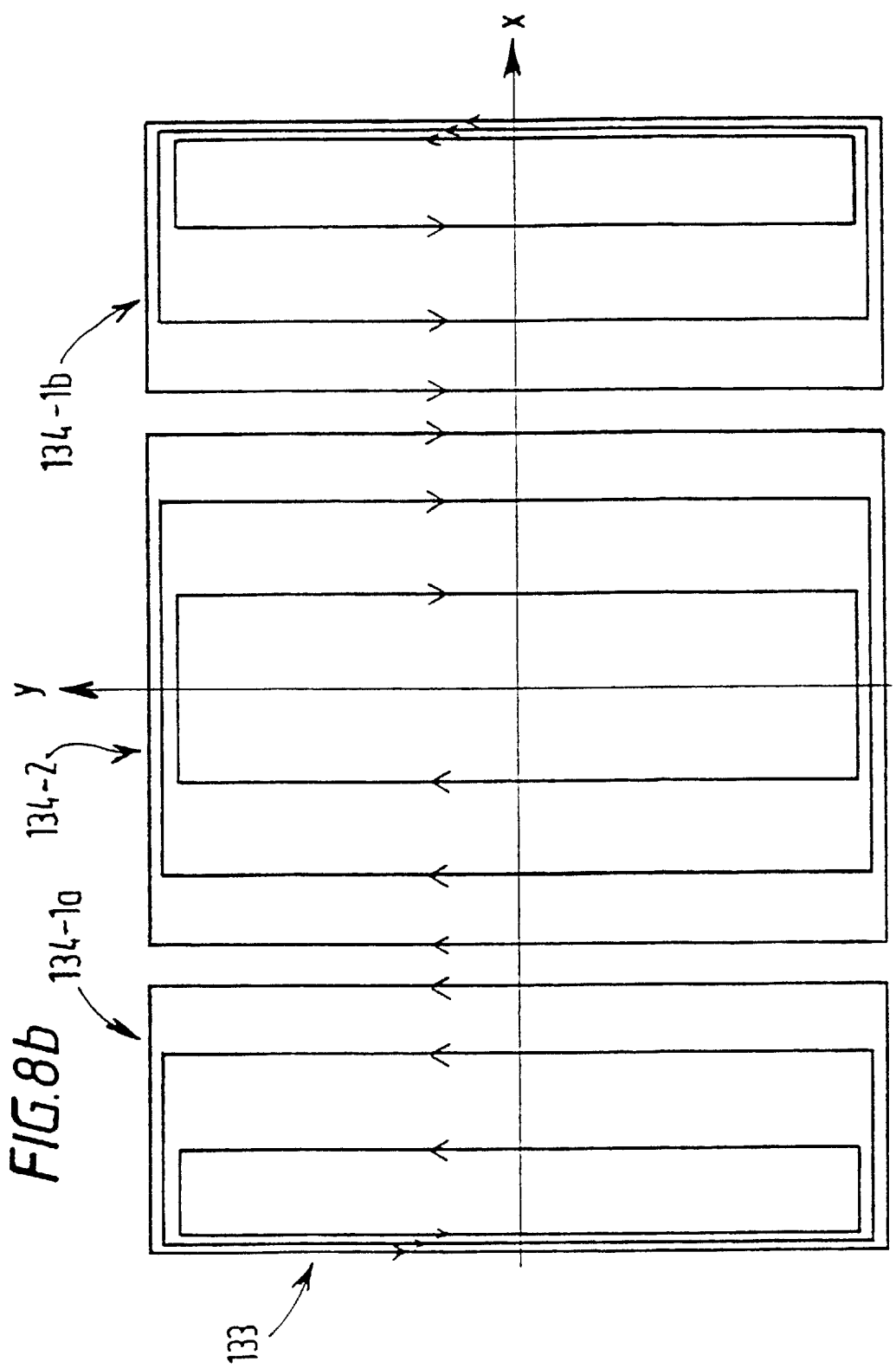

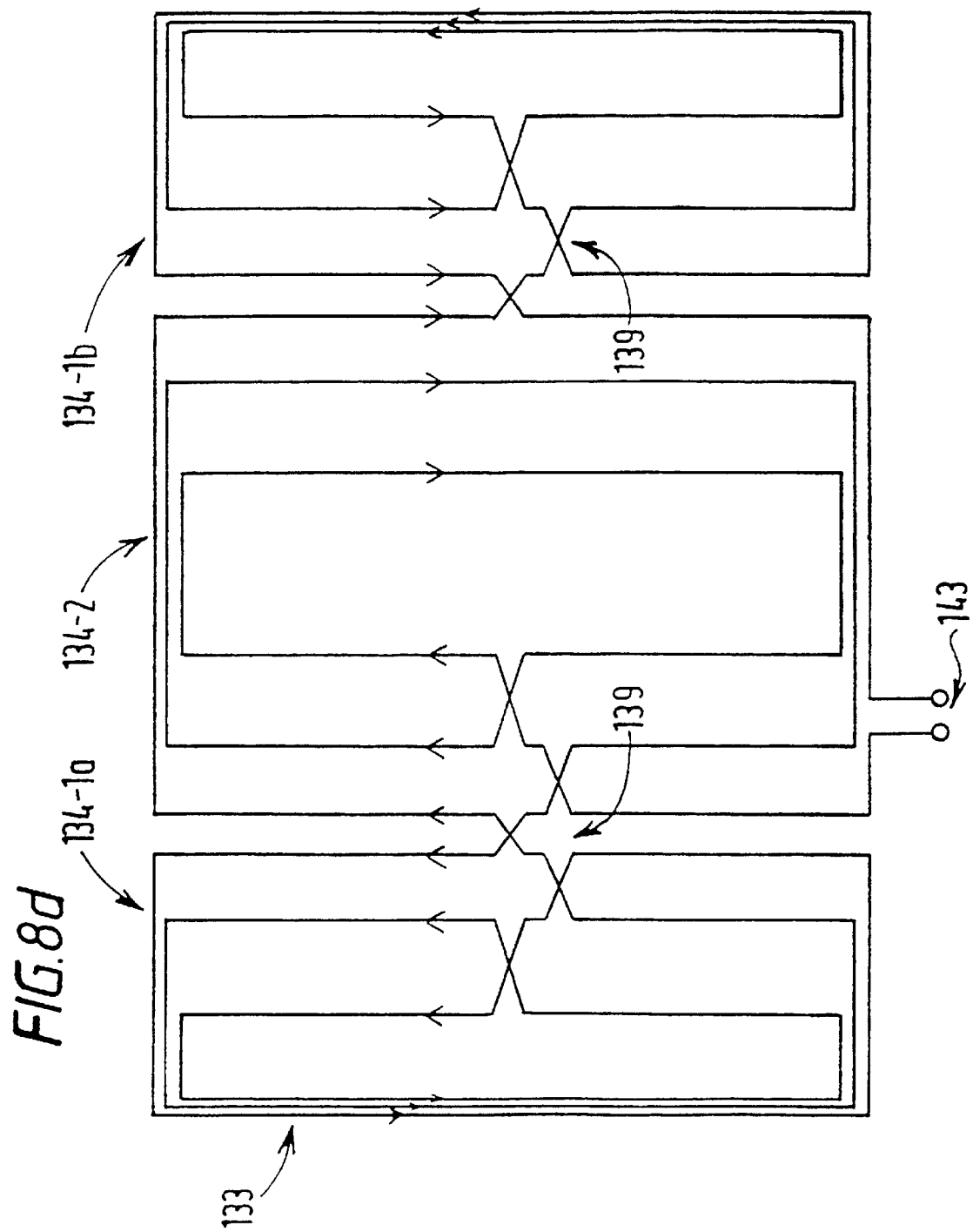

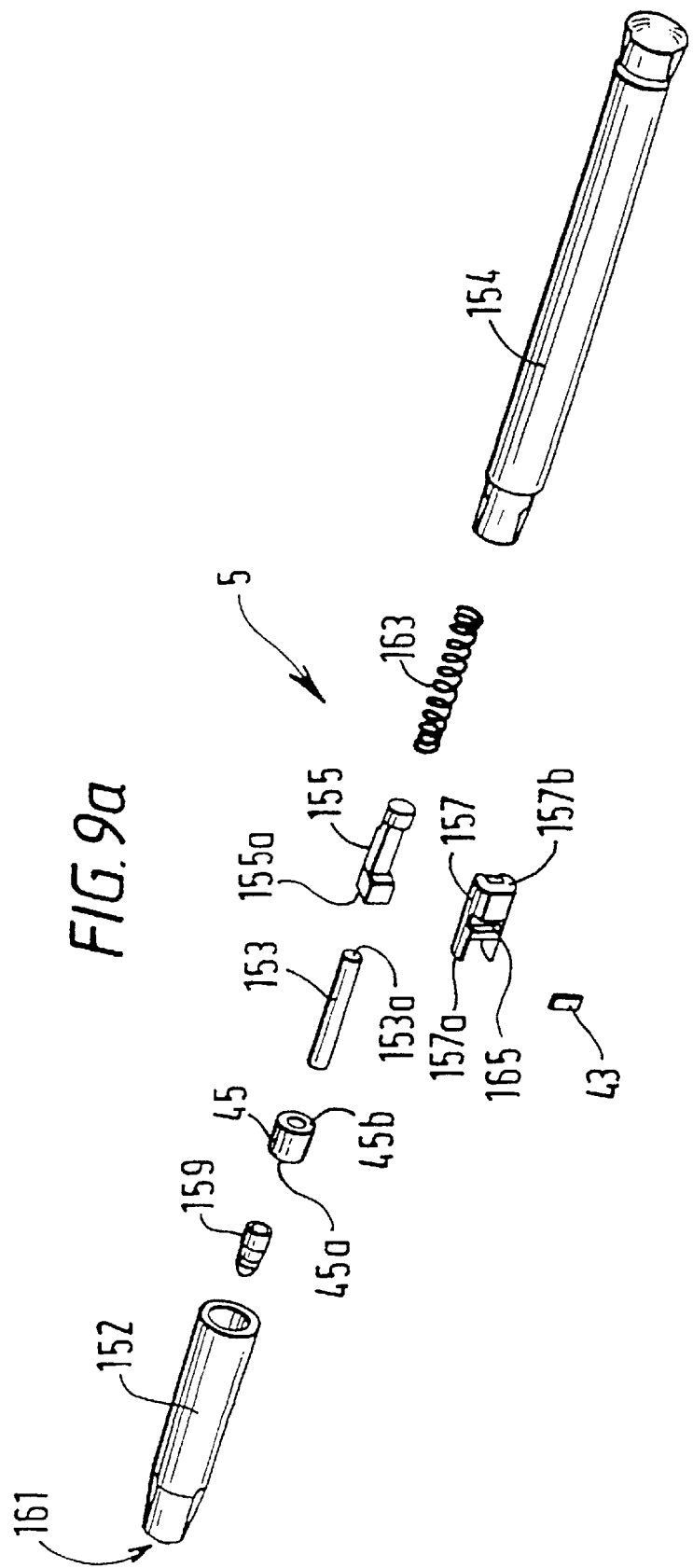

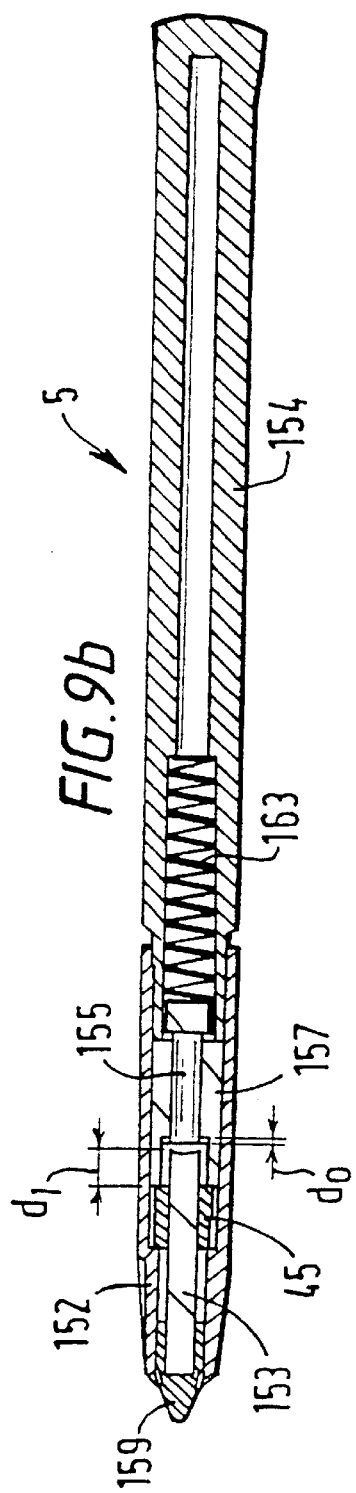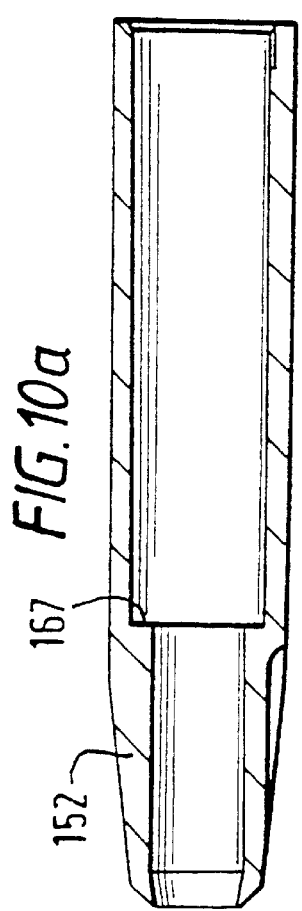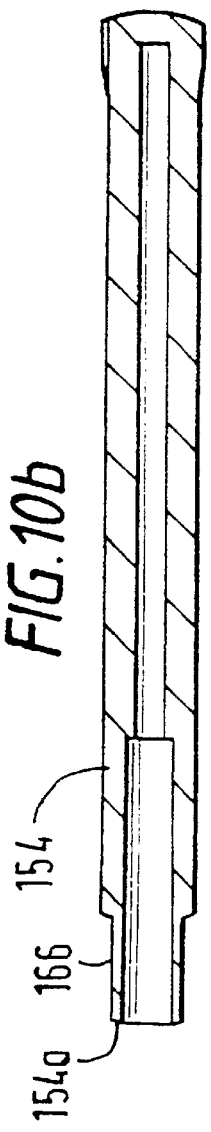

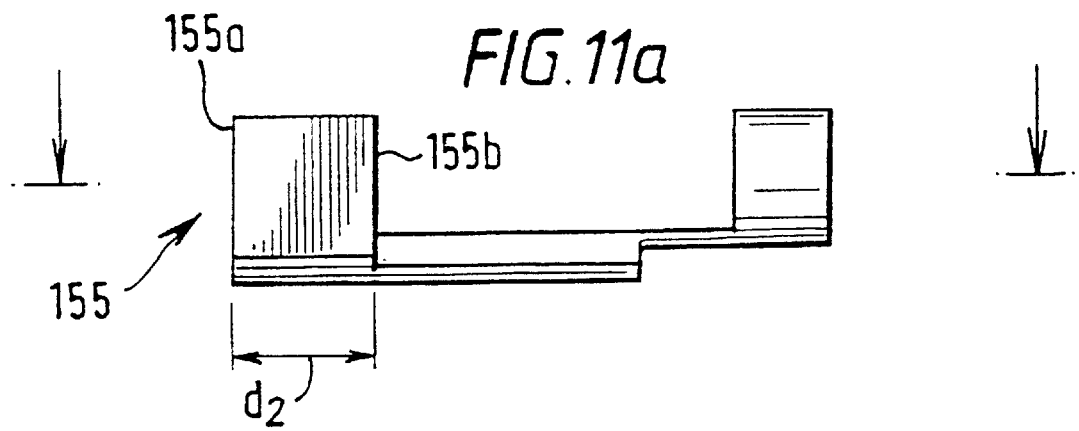
*FIG.11a*
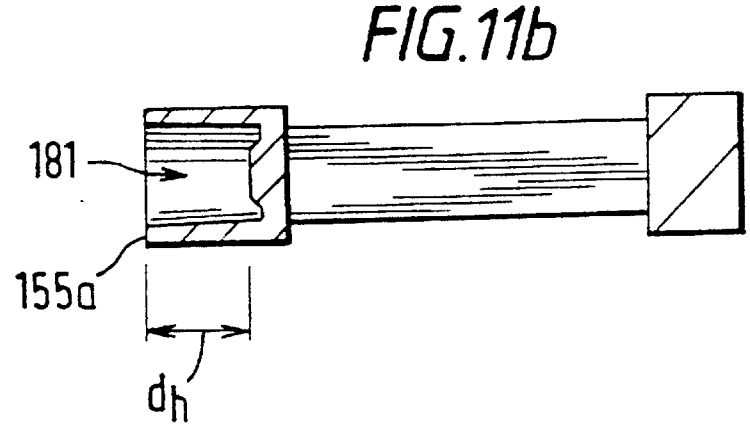
*FIG.11b*
*FIG.11c*
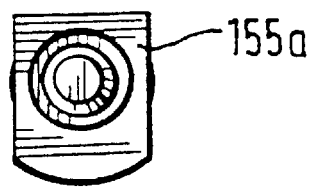
*FIG.11d*
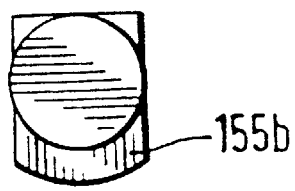

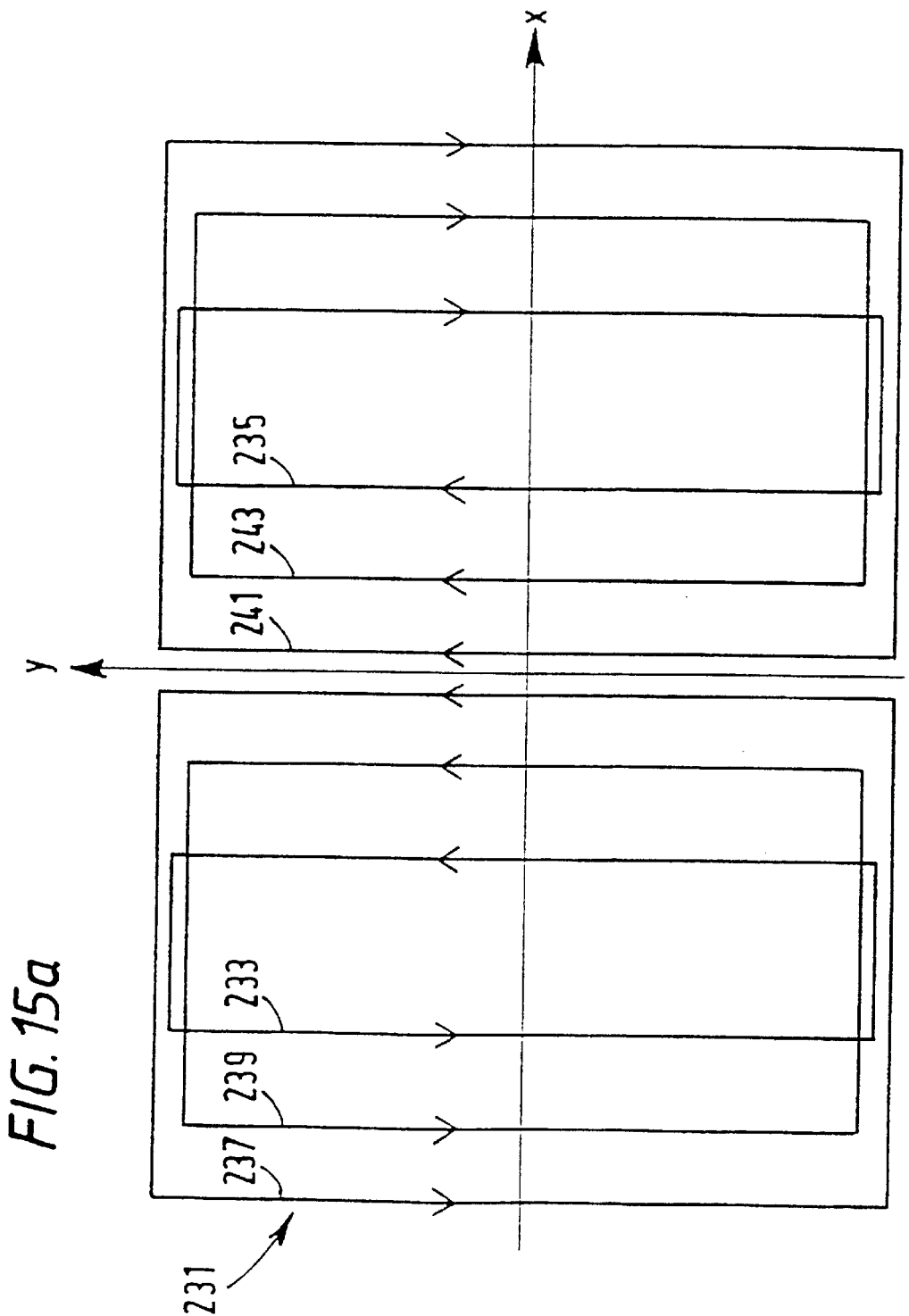

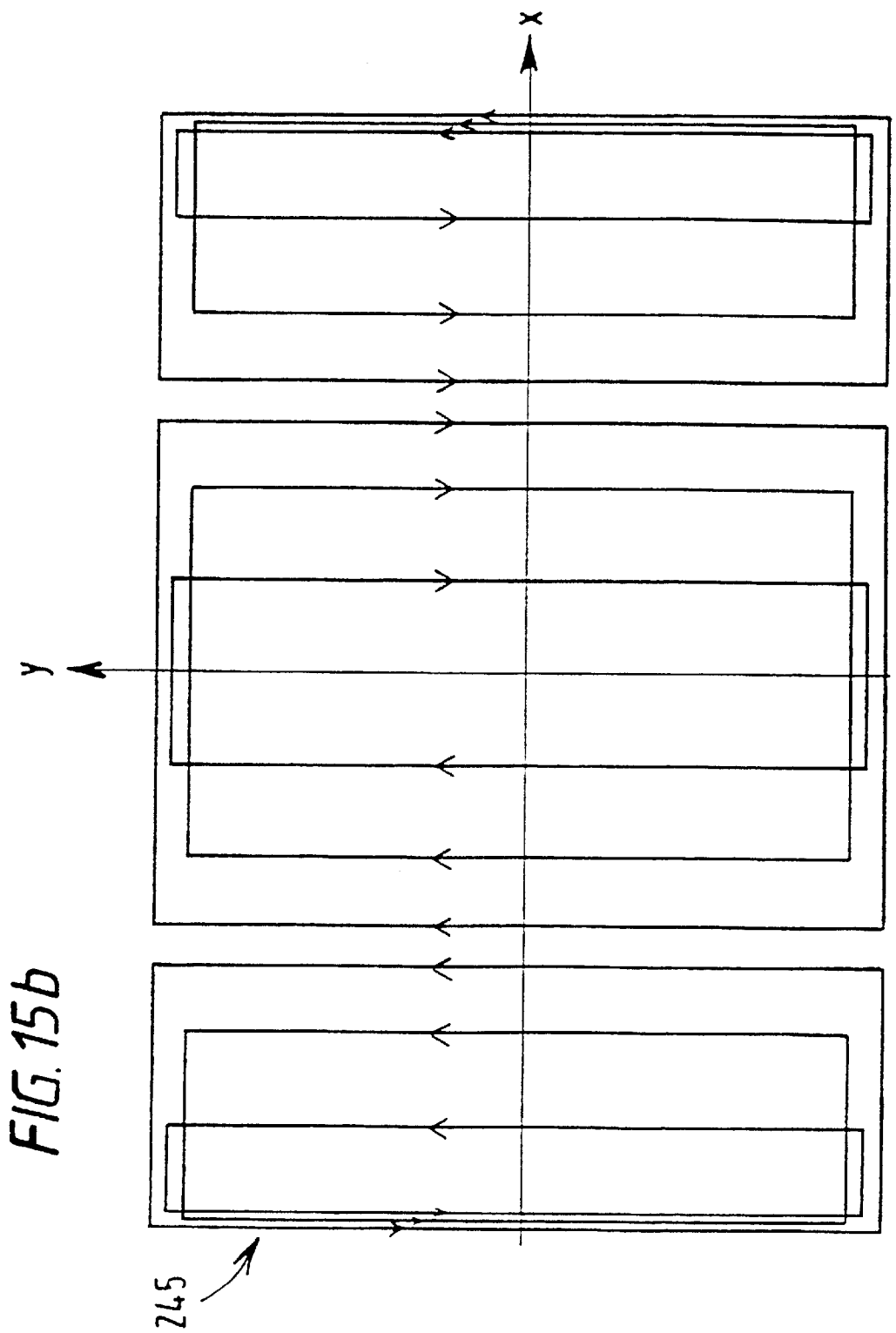

POSITION SENSOR

This is a continuation of PCT application PGT/GB99/03989 filed Nov. 29, 1999, the entire content of which is hereby incorporated by application.

The present invention relates to a position sensor and to parts therefor. The invention has particular although not exclusive relevance to x-y digitising tablets which operate with a cordless stylus. The invention is particularly useful for embedding behind the display of a hand-held electronic device such as a personal digital assistant (PDA), mobile telephone, web browser or products embodying combinations of these.

U.S. Pat. No. 4,878,553 discloses an x-y digitising tablet which uses a resonant stylus. The digitising tablet comprises a large number of overlapping but separate loop coils which are arrayed in the x- and y-direction. These loop coils are connected through a switching matrix to an excitation circuit and a receiving circuit. The system is arranged so that each of the loop coils is firstly connected to the transmitting circuit and then to the receiving circuit. The system identifies the current position of the stylus by detecting the excitation and sensor coil combination which provides the greatest output signal levels. A more accurate determination of the stylus position is obtained by performing a quadratic-type interpolation using the signals received from the loop coils adjacent to the loop coil having the maximum signal level. One problem with this system is that there is a trade-off between the system's response time and the accuracy of the tablet. In particular, for high accuracy, a large number of overlapping loop coils are required, however, as the number of loop coils increases, the system's response time decreases. Another problem with this system is that it has a relatively large "dead band" at the edge of the overlapping loop coils which causes problems when space is critical such as in hand-held computer devices such as PDAs and mobile telephones.

Another problem with this system is that it is too expensive for embedding into hand-held portable communication and information devices targeted at consumer markets. The conventional approach is to use resistive touch screen in these applications. This touch screen is usually placed over the liquid crystal display of the device. However, the problem with using such resistive touch screens is that it degrades the LCD's contrast, it increases glare and reflections from other light sources, it suffers from wear and adds significantly to product thickness. Further, it cannot cope with unintended contact with the touch screen because it does not differentiate between contact from different objects. As a result, the user cannot rest their hand on the device when using it, which may prevent them from using their normal comfortable writing style.

The applicant has described in its earlier International application WO98/58237 an alternative electromagnetic x-y digitising system which is more suited to such consumer applications. This system uses a set of periodic sensor windings and an excitation winding which can be embedded behind the liquid crystal display of the device. In operation, the excitation winding energises a resonant stylus which in turn induces signals in the sensor windings. Due to the periodic nature of the sensor windings, the output signals from them periodically vary with the relative position between the stylus and the sensor windings. Because this system only requires a few windings, there is not the same trade-off between system accuracy and response time (since all the windings can be read in parallel) and the "dead band" at the edge of the board can be made smaller because there are fewer windings. Further, because there are fewer windings, the sensor requires fewer connections to be made to the processing electronics and the system requires less power because only a single excitation winding is used which can be optimised for high efficiency by increasing the amount of copper and distributing it at the edge of the board without using excessive space at the edge of the board.

As acknowledged in this earlier International application, it is desirable to maximise the number of turns of the sensor windings and the excitation winding in order to maximise the coupling between those windings and the resonant stylus and to allow the suppression of unwanted spatial harmonic signals. One problem with the system described in the Applicant's earlier International application is that the windings are formed by wire bonding technology which suffers from poor resolution (for example three wires per millimeter) which limits the number of turns which can be formed for a given sensor area. Another technique which can be used which can increase the resolution is the use of printed circuit boards. However using printed circuit boards causes the problem of designing the windings in order to minimise the number of printed circuit board layers which are required and to minimise the number of through connections or vias which are required between the layers, in order to reduce manufacturing costs and wasted areas of the board especially at the edges.

A further problem which is common to both these known electromagnetic x-y digitising systems is that a positional error is introduced into the measurements if the stylus is tilted relative to the digitising tablet. In the applicant's above mentioned International application, they have proposed a technique for processing the signals output by the periodic sensor windings in order to reduce the effect of stylus tilt. Similarly, the proprietor of U.S. Pat. No. 4,878,553 has described, in EP-A-0680009, a technique for processing the signals received from the overlapping loop coils in order to reduce the effect of stylus tilt. However, these techniques require the reading of the signals from more of the sensor coils and the subsequent processing of these signals in order to determine the tilt measurement, which therefore increases the time required to determine a position measurement.

Another problem with the electromagnetic x-y digitising systems described above is that if they are to mimic the action of a conventional pen, then they must be able to detect when the stylus is pressed against the writing surface. This is usually accomplished by designing the stylus so that its resonant frequency changes with pressure applied to the tip of the stylus. This leads to problems of how to design the resonant stylus so that the system can reliably detect "stylus down" whilst providing a stylus which feels natural to use. Several prior art designs of this type of stylus are disclosed in U.S. Pat. No. 5,565,632. However, these systems suffer from problems of ensuring that a desired and repeatable resonant frequency change is obtained when pressure is applied to the stylus.

According to one aspect, the present invention provides a stylus for use with a position detector, the stylus comprising:
  an elongate housing;
  a movable tip mounted at one end of the housing for axial movement relative thereto in a first direction from a retracted position to an extended position and in a second, opposite direction from the extended position to the retracted position;
  a sensing coil fixed in the housing and having an abutment surface facing in said second direction;
  a flux linkage element mounted to the tip for movement relative to the coil; and movement-limiting means to define the extent of movement of the tip relative to the housing between said extended and retracted positions, said movement-limiting means comprising:

a first limiting element mounted to the flux linkage element and having a first abutment surface facing in said first direction and a second abutment surface facing in said second direction;

a second limiting element fixed in the housing axially adjacent to the coil and having first and second abutment surfaces facing in said first direction, the first abutment surface contacting the abutment surface of the coil; and the arrangement being such that when the tip is in the retracted position, the second abutment surface of the first limiting element contacts the second abutment surface of the second limiting element and when the tip is in the extended position the second abutment surface of the first limiting element contacts the abutment surface of the coil.

According to another aspect, the present invention provides a stylus for use with a position detector, the stylus comprising:

an elongate housing;

a movable tip mounted at one end of the housing for axial movement relative thereto in a first direction from a retracted position to an extended position and in a second, opposite direction from the extended position to the retracted position;

a sensing coil fixed in the housing and having an abutment surface facing in said second direction;

a flux linkage element mounted to the tip for movement relative to the coil; and movement-limiting means to define the extent of movement of the tip relative to the housing between said extended and retracted positions, said movement-limiting means comprising a limiting element mounted to the flux linkage element and having an abutment surface facing in said first direction for contacting the abutment surface of said coil when the tip is in said extended position:

characterised in that said flux linkage element is elongate and wherein the limiting element comprises a blind bore of a predetermined depth for receiving and holding said elongate element, whereby when the tip is in said extended position, the end of said elongate element is a predetermined distance from the abutment surface of said coil.

According to a further aspect, the present invention provides a stylus for use with a position detector, the stylus comprising:

an elongate housing:

a movable tip mounted at one end of the housing for axial movement between a retracted position and an extended position;

a formerless sensing coil; and a flux linkage element which extends through the coil;

wherein said formerless coil and said flux linkage element are mounted for relative movement with the movement of said tip, whereby the inductance of said coil is changed with the movement of said tip.

According to another aspect, the present invention provides a stylus for use with a position detector, the stylus comprising:

an elongate housing;

a movable tip mounted at one end of the housing for axial movement relative thereto in a first direction from a retracted position to an extended positoin and in a second, opposite direction from the extended position to the retracted position;

a sensing coil;

a flux linkage element;

wherein the sensing coil and the flux linkage element are mounted for relative movement with the movement of said tip, whereby the inductance of said coil is changed with the movement of said tip;

characterised by movement-limiting means which defines the extent of movement of the tip relative to the housing between said extended and retracted positions, said movement-limiting means comprising a first limiting element mounted for movement with the tip and a second movement-limiting element fixed to the housing;

wherein said first and second limiting elements comprise a first abutment surface facing in said first direction and a second abutment surface facing in said second direction and wherein the arrangement is such that when the tip is in the retracted position the second abutment surface of the first limiting element contacts the first abutment surface of the second limiting element and when the tip is in the extended position the first abutment surface of said first limiting element contacts the second abutment surface of said second limiting element.

According to a further aspect, the present invention provides a stylus for use with a position detector, the stylus comprising:

an elongate housing;

a movable tip mounted at one end of the housing for axial movement relative thereto in a first direction from a retracted position to an extended position and in a second, opposite direction from the extended position to the retracted position;

a sensing coil having an abutment surface;

a flux linkage element;

wherein said sensing coil and said flux linkage element are mounted for relative movement with the movement of said tip, whereby the inductance of the coil is changed with the movement of the tip; and means for limiting the movement of the tip relative to the housing comprising a limiting element mounted for movement with the tip and having an abutment surface facing in said first direction for contacting the abutment surface of said coil when the tip is in said extended position;

characterised in that said flux linkage element is elongate and wherein the limiting element comprises a blind bore of a predetermined depth within said abutment surface for receiving and holding said elongate element, whereby when the tip is in said extended position, the end of said elongate element is a predetermined distance from the abutment surface of said coil.

Various other features and aspects of the present invention will become apparent from the following description of exemplary embodiments which are described with reference to the accompanying drawings in which:

FIG. 1 is a schematic view of a hand-held personal digital assistant (PDA) which includes an x-y digitising system located behind the PDA's liquid crystal display which can sense the (x,y) position of a resonant stylus;

FIG. 2 schematically illustrates a cross-sectional view of the personal digital assistant shown in FIG. 1, illustrating the positional relationship between a sensor printed circuit board of the digitising system and the liquid crystal display;

FIG. 3 is a schematic functional block diagram illustrating the excitation and processing electronics of the x-y digitising system and illustrating the magnetic coupling between an excitation winding of the digitising system and the resonant stylus and the magnetic coupling between the resonant stylus and four sensor windings which form part of the digitising system;

FIG. 4a schematically illustrates an approximation of the way in which the peak amplitude of the signals induced in the x-sensor windings of the digitising system vary with the x-coordinate of the position of the stylus relative to the liquid crystal display;

FIG. 4b schematically illustrates an approximation of the way in which the peak amplitude of the signals induced in the y-sensor windings of the digitising system vary with the y-coordinate of the position of the stylus relative to the liquid crystal display;

FIG. 7a illustrates the form of the excitation winding which forms part of the digitising system which forms part of the personal digital assistant shown in FIG. 1;

FIG. 7c illustrates the form of a cos x sensor winding of the digitising system which forms part of the personal digital assistant shown in FIG. 1;

FIG. 7d illustrates the form of a sin y sensor winding of the digitising system which forms part of the personal digital assistant shown in FIG. 1;

FIG. 7e illustrates the form of a cos y sensor winding of the digitising system which forms part of the personal digital assistant shown in FIG. 1;

FIG. 7f shows a top layer of a printed circuit board which carries the windings shown in FIGS. 7a to 7e;

FIG. 7g shows a bottom layer of the printed circuit board which carries the windings shown in FIGS. 7a to 7e;

FIG. 8b shows an ideal but impractical form of the cos x sensor winding which the winding shown in FIG. 7c approximates;

FIG. 8d illustrates the way in which a number of cross-over connections can be made to the impractical winding shown in FIG. 8b to form a practical sensor winding similar to the winding shown in FIG. 7c;

FIG. 9a is an exploded perspective view of the resonant stylus shown in FIG. 1;

FIG. 9b is a cross-section of the assembled resonant stylus;

FIG. 10a is a cross-sectional view of a front portion of the resonant stylus body;

FIG. 10b is a cross-sectional view of a rear portion of the resonant stylus body;

FIG. 11a is a top view of a first movement-limiting member which forms part of the resonant stylus;

FIG. 11b is a cross-sectional view of the first movement-limiting member shown in FIG. 11a;

FIG. 11c is an end view of the first movement-limiting member from a first end thereof;

FIG. 11d is an end view of the first movement-limiting member from the other end thereof;

FIG. 12b is a cross-sectional view of the second movement-limiting member shown in FIG. 12a;

Figure 14:
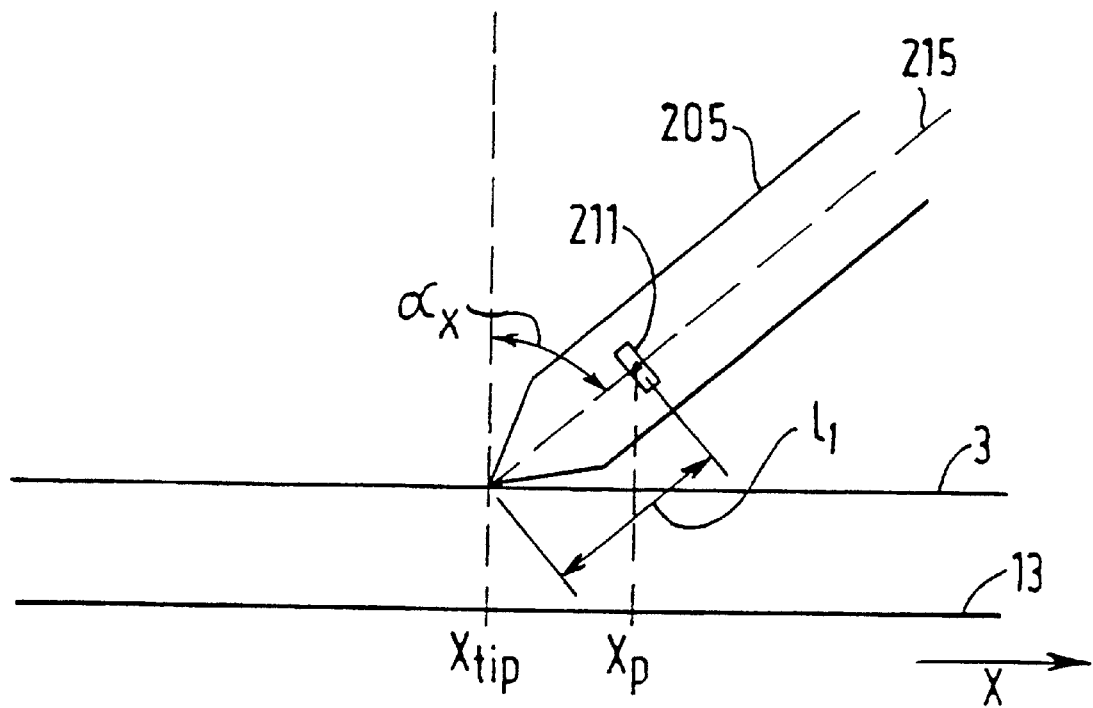
Figure 16:
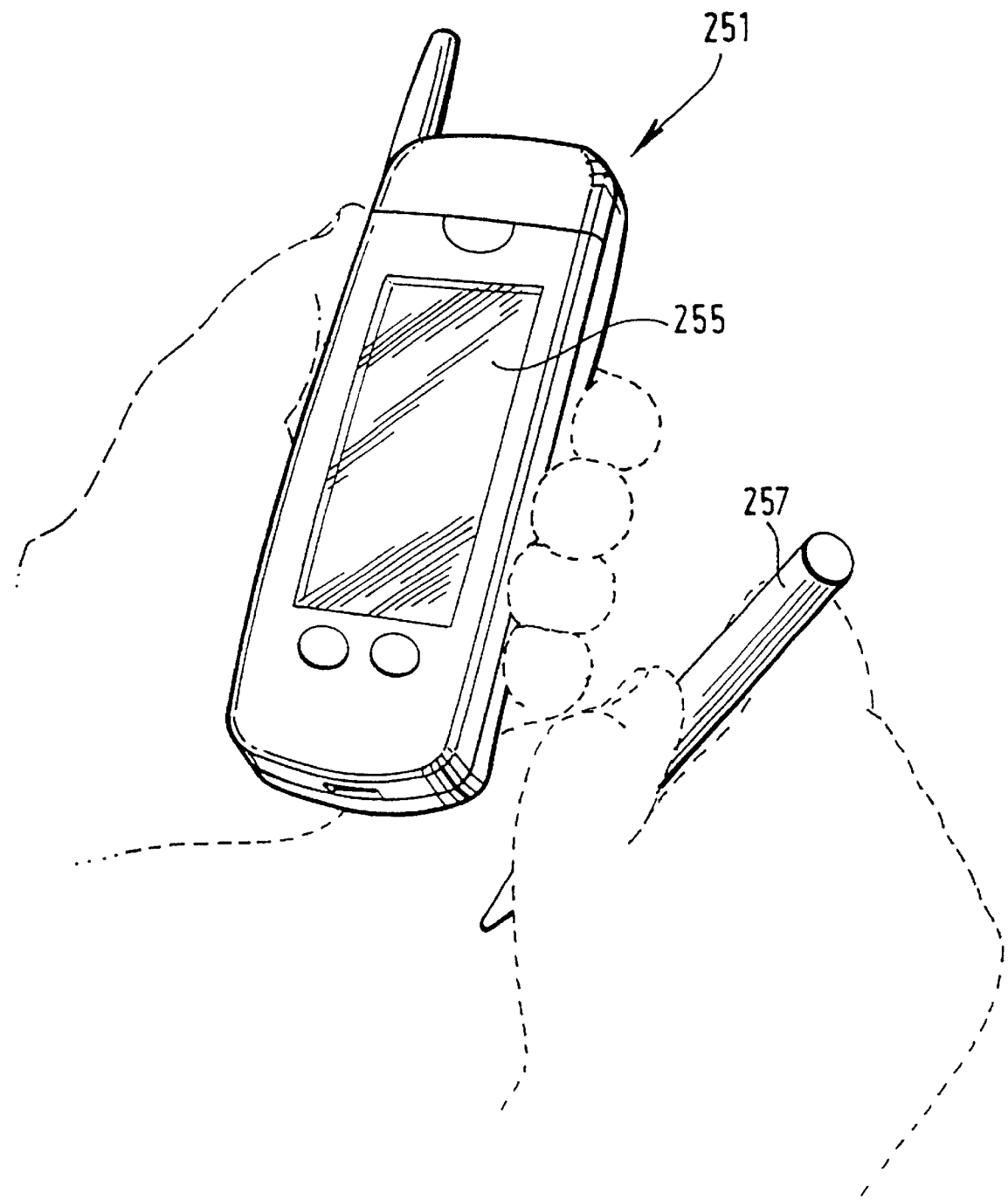
Figure 17A:
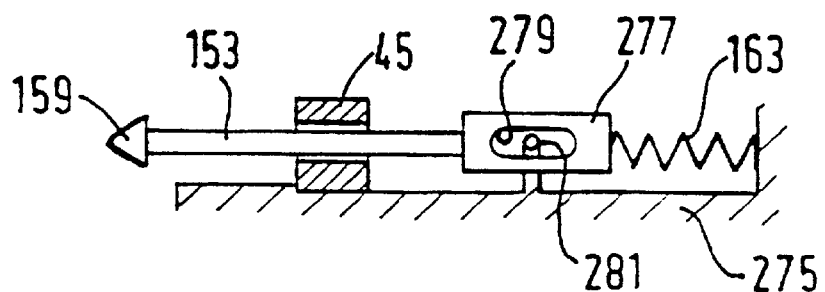
Figure 17B:
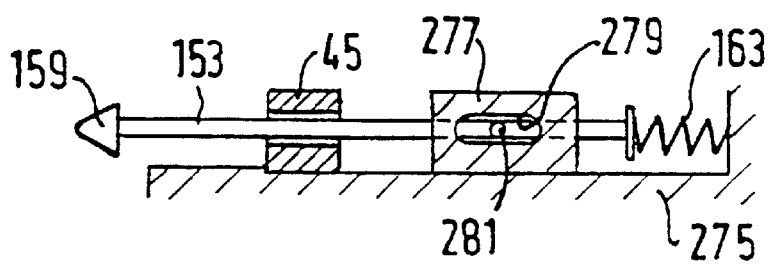
Figure 17C:
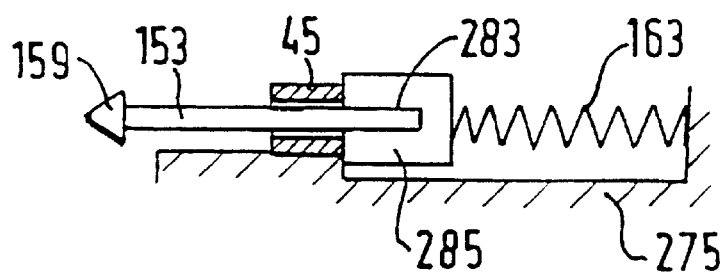

FIG. 14 schematically illustrates the way in which the tilt of the stylus affects the apparent position of the stylus relative to the digitiser system;

FIG. 15a shows an ideal but impractical form of a sin x sensor winding which uses an interleaving technique in order to reduce space required at the edges of the sensing area for connecting conductors extending in the x-direction;

FIG. 15b shows an ideal but impractical form of a cos x sensor winding which uses an interleaving technique in order to reduce space required at the edges of the sensing area for connecting conductors extending in the x-direction;

FIG. 16 is a perspective view showing a mobile telephone having a liquid crystal display and sensor windings and excitation windings of a digitising system under the display which is operable to sense the position of a resonant stylus relative to the display;

FIG. 17a diagrammatically illustrates a first alternative form of stylus;

FIG. 17b diagrammatically illustrates a second alternative form of stylus;

FIG. 17c diagrammatically illustrates a third alternative form of stylus; and

Figure 17D:
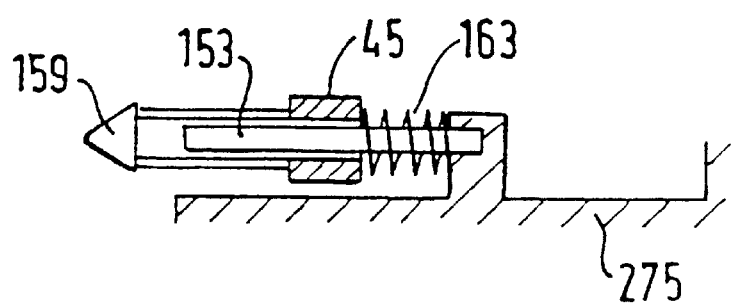

FIG. 17d diagrammatically illustrates a fourth alternative form of stylus.

Figure 1:
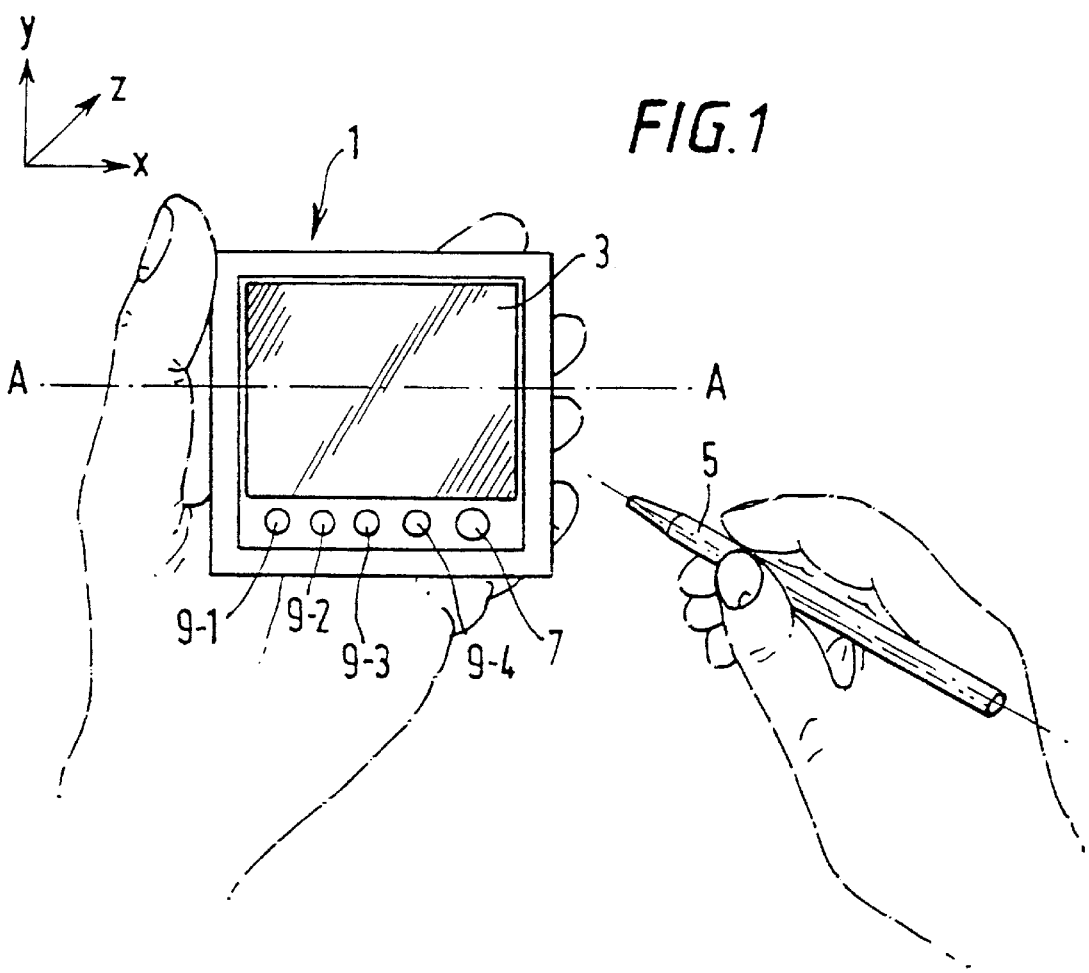

FIG. 1 shows a hand-held personal digital assistant (PDA) 1 which employs an x-y digitising system (not shown) which is located beneath a liquid crystal display 3 of the PDA 1. The x-y digitising system is operable to detect the presence and x-y position of a resonant stylus 5 relative to the LCD 3. The position signals output from the digitising system are used by the PDA 1 to control information that is displayed on the LCD 3 and to control the operating function of the PDA 1. As shown, the PDA 1 also includes a number of push buttons beneath the LCD 3 including an on-off button 7 and a number of control buttons 9-1 to 9-4 which are used to control different functions of the PDA 1.

Figure 2:
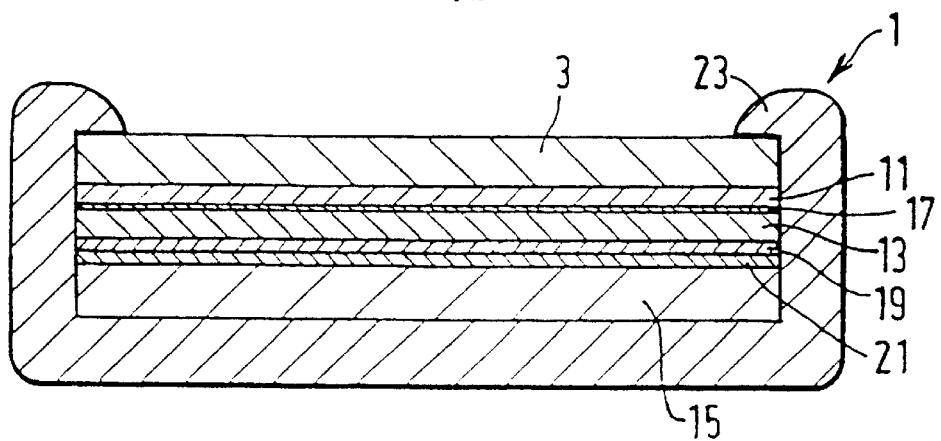

FIG. 2 shows a cross-sectional view on A—A of the PDA 1 shown in FIG. 1. As shown, the PDA 1 includes a liquid crystal display 3 which, in this embodiment, is between 1.5 mm and 3 mm thick. Beneath the LCD 3, there is an electroluminescent backlight 11 for providing a backlight for the LCD 3. In this embodiment, this backlight layer 11 has a thickness of approximately 150 $\mu$m. Beneath these layers, there is a 0.2 mm thick sensor printed circuit board (PCB) 13 which forms part of the above-mentioned x-y digitising system. This sensor PCB 13 carries the excitation winding and the sensor windings used for sending signals to and receiving signals from the resonant stylus 5. Beneath the sensor PCB 13 there is a printed circuit board 15 which carries the electronics for controlling the functions of the PDA and the electronics for processing the signals received from and controlling the signals sent to the windings on the sensor PCB 13.

As shown in FIG. 2, in this embodiment, a grounded electrostatic screen 17 is provided between the sensor printed circuit board 13 and the electroluminescent backlight 11 in order to reduce noise from the liquid crystal display 3 and the backlight 11 from interfering with the x-y digitising system. In this embodiment, this electrostatic screen is formed from a continuous layer of carbon ink which is approximately 10 $\mu$m thick and has a relatively high surface resistivity (e.g. >1 ohm per square) so that it does not interfere with the magnetic sensing function. Further, as shown in FIG. 2, beneath the sensor PCB 13 is a 50 $\mu$m layer of pressure sensitive adhesive 19 for bonding the sensor PCB 13 onto a magnetic screen 21, which in this embodiment is a 25 $\mu$m layer of spin melt ribbon (for example Vitrovac 6025 manufactured by Vacuumschmelze, Hanau, Germany). As those skilled in the art will appreciate, the magnetic screen 21 is provided in order to reduce any disturbance which may be caused to the x-y digitising system by, for example, the electronics behind the sensor PCB 13. It also enhances the sensitivity of the x-y digitising system since it provides a permeable path for magnetic flux to pass behind the sensor windings on the sensor PCB 13. Conventional magnetic screens have either used silicon steel or a plastic or rubber material containing iron or ferrite powder. However, these conventional screens are relatively thick and heavy compared with the 25 $\mu$m layer of spinmelt ribbon used in the present embodiment. This benefit arises because the spin melt ribbon has a very high intrinsic permeability (e.g. greater than 10,000) which enables a small thickness of for example 25 $\mu$m to act as an efficient shield, thus saving space. Further, unlike the prior art screens, the permeability of spin melt ribbon does not fall when worked or shocked, and therefore its lifetime will be greater than those of the conventional magnetic screens, especially when used in portable equipment such as PDAs and portable telephones. This spin melt ribbon also has the advantage that it solves the field distortion problems associated with the grained shielding materials (such as silicon steel) used in the prior art systems, because it is amorphous. As shown in FIG. 2 encasing these layers and providing mechanical support is an outer casing 21 which is made, in this embodiment, from plastic.

Overview of X-Y Digitiser Operation

Figure 3:
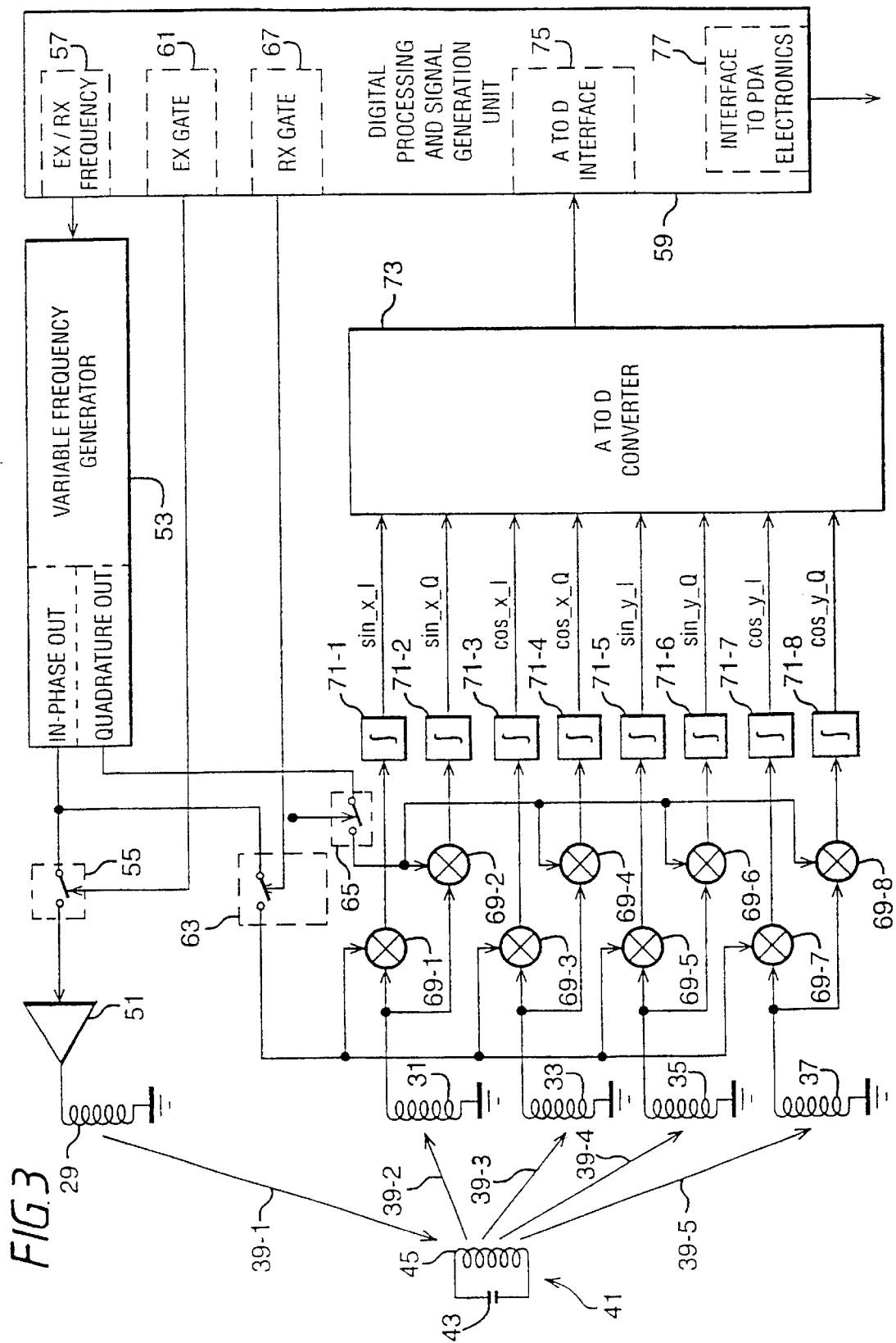

FIG. 3 schematically illustrates a functional block diagram of the digitising system's processing electronics. FIG. 3 also illustrates the way in which the excitation winding and the sensor windings interact with the resonant stylus 5. In particular, FIG. 3 schematically shows an excitation winding 29, two x-sensor windings 31 and 33 for sensing x position and two y-sensor windings 35 and 37 for sensing y position. Each of these windings is formed by printed conductors on the sensor PCB 13. As will be explained in more detail below, the sensor windings 31, 33, 35 and 37 are periodic and are in spatial phase quadrature relative to each other. Therefore, in the following description x-sensor winding 31 will be referred to as the sin x sensor winding, x-sensor 33 will be referred to as the cos x sensor winding, y-sensor winding 35 will be referred to as the sin y sensor winding and y-sensor winding 37 will be referred to as the cos y sensor winding. As illustrated by the arrows 39, these windings are operable, in use, to couple magnetically with a resonant circuit 41 (comprising a capacitor 43 and an inductor coil 45) in the resonant stylus 5.

In operation, an excitation current is applied to the excitation winding 29 through an excitation driver 51. In this embodiment, the excitation current comprises a sequence of positive and negative pulses having a peak value of approximately 100 mA and having a fundamental frequency component ($F_0$) of approximately 100 kHz, which is matched to the resonant frequency of the resonant circuit 41. This excitation signal is generated by a variable frequency generator 53 which generates an appropriate excitation voltage which is applied to the excitation driver 51 through a switch 55. In this embodiment, the frequency of the excitation voltage generated by the generator 53 is set by an excitation/receive frequency control circuit 57 which forms part of a digital processing and signal generation unit 59. As those skilled in the art will appreciate, by using such a variable frequency generator 53, the digitising system can be reconfigured to operate with a stylus having a different resonant frequency.

The excitation current flowing in the excitation winding 29 generates a corresponding electromagnetic field which magnetically couples, as indicated by the arrow 39-1, with the resonant circuit 41 and causes it to resonate. In this embodiment, the excitation winding 29 is arranged to keep the coupling with the resonator as constant as possible with the x-y position of the stylus relative to the LCD 3. When the resonator 41 is resonating, it generates its own electromagnetic field which magnetically couples, as represented by the arrows 39-2, 39-3, 39-4 and 39-5, with the sensor windings 31, 33, 35 and 37 respectively. As will be explained in more detail below, the sensor windings 31, 33, 35 and 37 are designed so that the coupling between them and the resonant stylus varies with the x or y position of the stylus and so that there is minimum direct coupling between them and the excitation winding 29. Therefore, the signal received in the sensor windings should only vary with the magnetic coupling between the resonator 41 and the respective sensor winding. Consequently, by suitable processing of the signals received in the sensor windings, the x-y position of the resonator 41, and hence of the resonant stylus 5, can be determined relative to the sensor windings.

In this embodiment, the excitation current is not continuously applied to the excitation winding 29. Instead, bursts of the excitation current (comprising 12 positive and 12 negative pulses of the excitation current) are applied, with the application of the excitation bursts being controlled by opening and closing the switch 55. As shown in FIG. 3, this is controlled by an excitation gate controller 61 which forms part of the digital processing and signal generation unit 59. In this embodiment, in order to reduce the effect of any breakthrough from the excitation winding to the sensor windings, the signals induced in the sensor windings are only detected between the bursts of the excitation current. This is achieved by controlling the positions of switches 63 and 65 with the receive gate controller 67 which forms part of the digital processing and signal generation unit 59. This mode of operation is referred to as pulse echo and works because the resonator 41 continues to resonate after the burst of excitation current has ended.

As a result of the periodic nature of the sensor windings and their relative positions, the four signals induced in the four sensor windings from the resonant circuit 41 can be approximated by:

$$E_{31} = Ae^{-t/\tau} \sin\left[\frac{2\pi x}{L_x}\right] \cos[2\pi F_o t + \phi] \tag{1}$$

$$E_{33} = Ae^{-t/\tau} \cos\left[\frac{2\pi x}{L_x}\right] \cos[2\pi F_o t + \phi] \tag{2}$$

$$E_{35} = Ae^{-t/\tau} \sin\left[\frac{2\pi y}{L_y}\right] \cos[2\pi F_o t + \phi] \tag{3}$$

$$E_{37} = Ae^{-t/\tau} \cos\left[\frac{2\pi x}{L_y}\right] \cos[2\pi F_o t + \phi] \tag{4}$$

where A is a coupling coefficient which depends upon, among other things, the distance of the stylus from the windings and the number of turns in the sensor windings; x is the x-position of the resonant stylus relative to the sensor windings; y is the y-position of the resonant stylus relative to the sensor windings; $L_x$ is a spatial wavelength of the sensor windings in the x-direction and is typically slightly greater than the width of the board in the x-direction (and in this embodiment is 70 mm); $L_y$ is a spatial wavelength of the sensor windings in the y-direction and is typically slighter greater than the width of the board in the y-direction (and in this embodiment is 50 mm); $e^{-t/\tau}$ is the exponential decay of the resonator signal after the burst of excitation signal has ended, with $\tau$ being a resonator constant which depends upon, among other things, the quality factor of the resonant circuit 41; and ø is an electrical phase shift caused by a difference between the fundamental frequency of the excitation current and the resonant frequency of the resonator 41. In this embodiment, the resonant stylus 5 is designed so that its resonant frequency changes with the pressure applied to the tip of the stylus. This change in frequency causes a change in the phase shift ø.

Figure 4A:
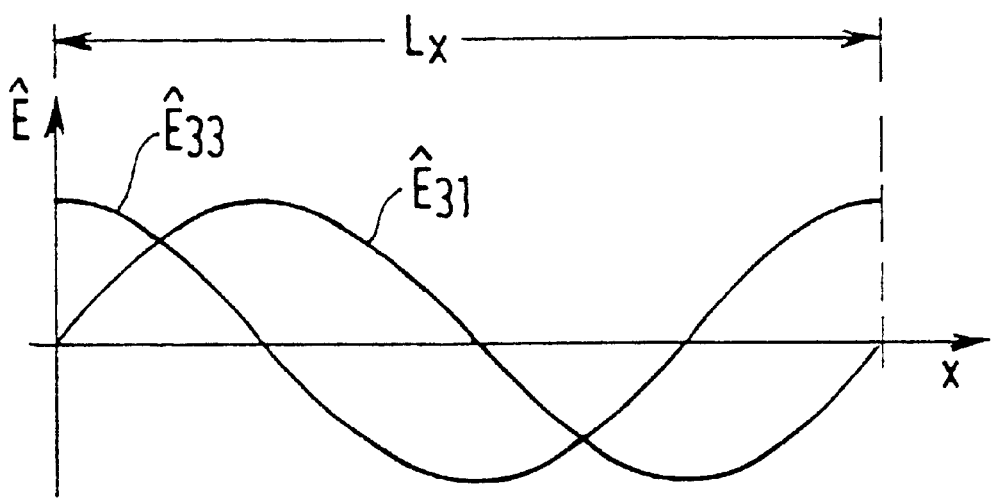
Figure 4B:
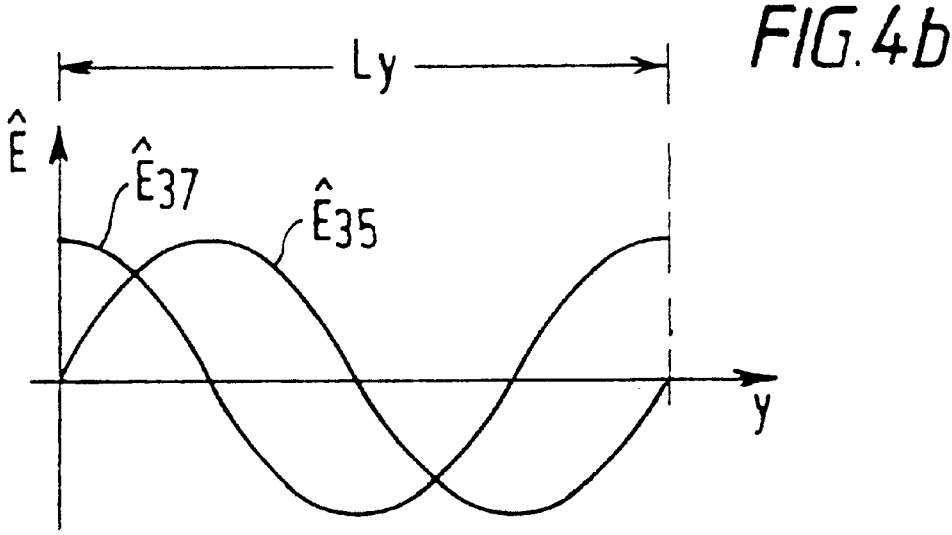

As can be seen from equations (1) to (4), the peak amplitude of the signals induced in the sensor windings vary as the sin or cos of either the x or y position. This is illustrated in FIGS. 4a and 4b. In particular, FIG. 4a illustrates the way in which the peak amplitude of the signal induced in sensor winding 31 and the way in which the signal induced in sensor winding 33 varies with the x-position of the resonant stylus relative to the sensor windings and FIG. 4b shows the way in which the peak amplitude of the signals induced in sensor winding 35 and sensor winding 37 vary with the y-position of the resonant stylus relative to the sensor windings. As shown in FIG. 4, the pitch ($L_x$) of the windings in the x-direction is greater than the pitch ($L_y$) of the windings in the y-direction. This is because, in this embodiment, the measurement area is rectangular.

Therefore, as those skilled in the art will appreciate, both the x-y position information of the resonant stylus 5 and the phase shift ø can be determined from the signals induced in the sensor windings by suitable demodulation and processing. As shown in FIG. 3, this demodulation is achieved by mixing the received signals with the excitation voltage generated by the variable frequency generator 53 in the mixers 69-1 to 69-8. In this embodiment, an in-phase component and a quadrature phase component of the excitation signal is mixed with the signal induced in each of the sensor windings. This generates an in phase (I) component and a quadrature phase (Q) component of each of the demodulated signals. In this embodiment, the in phase components of the demodulated signals from all the sensor windings are used to determine the position information and the in phase and quadrature phase components of the demodulated signal from one of the sensor windings are used to determine the electrical phase shift (i.e. ø). As shown in FIG. 3, the output from these mixers are input to a respective integrator 71-1 to 71-8 which, after being reset, integrate the outputs from the mixers over a time period which is a multiple of $1/F_0$ (in order to remove the effect of the time varying components output by the mixer). The following equations approximate the outputs from the integrators 71-1 to 71-4:

$$\sin\_x\_I = A_1 \sin\left[\frac{2\pi x}{L_x}\right] \cos\phi \tag{5}$$

$$\sin\_x\_Q = A_1 \sin\left[\frac{2\pi x}{L_x}\right] \sin\phi \tag{6}$$

$$\cos\_x\_I = A_1 \cos\left[\frac{2\pi x}{L_x}\right] \cos\phi \tag{7}$$

$$\cos\_x\_Q = A_1 \cos\left[\frac{2\pi x}{L_x}\right] \sin\phi \tag{8}$$

where $A_1$ is a constant which varies with, among other things, the constant A, the resonator $\tau$ and the integration period. Similar signals are obtained from integrators 71-5 to 71-8, except these vary with the y-position rather than with the x-position.

As shown in FIG. 3, the outputs from the integrators 71 are input to an analogue-to-digital converter 73 which converts the outputs into digital values which are input to the A to D interface unit 75 in the digital processing and signal generation unit 59. The digital processing and signal generation unit 59 then performs an arc tangent function (atan 2) on the ratio of the sin\_x\_I signal and the cos\_x\_I signal to determine the x-position of the resonant stylus and similarly performs an arc tangent function on the ratio of the sin\_y\_I signal and the cos\_y\_I to determine the y-position of the resonant stylus 5. The digital processing and signal generation unit 59 also calculates an arc tangent function on the ratio of the quadrature phase component to the in phase component of the signals from one of the sensor windings, in order to determine the phase angle ø.

As shown in FIG. 3, the in phase and quadrature phase component for the signal induced in each of the sensor windings is calculated. This is because, at certain x and y positions, the ratio of the in phase and quadrature phase components from the sensor windings will not be reliable. This occurs when the sin or cos position components are approximately zero. Therefore, in this embodiment, the digital processing and signal generation unit 59 determines the phase angle ø using a weighted combination of the in phase and quadrature phase signals from both the sin and cos windings, where the weighting used varies in dependence upon the determined x and y position of the stylus.

Figure 5:
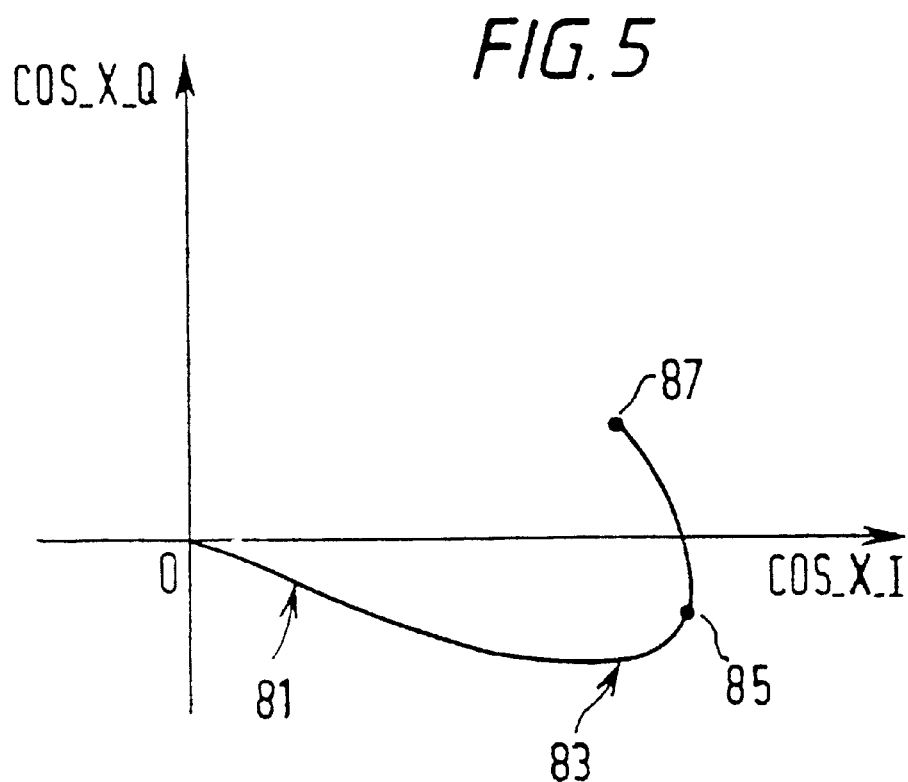
FIG. 5 is a plot illustrating the way in which an electrical phase signal generated from a signal output by one of the sensor windings, varies as the resonant stylus is brought into the vicinity of the digitising system and is brought into contact with the surface of the display on the personal digital assistant.

FIG. 5 is a plot of the cos\_x\_I signal against the cos\_x\_Q signal as the resonant stylus 5 is brought into the vicinity of the excitation and sensor windings and then brought down into contact with the LCD screen 3. Initially, when the stylus 41 is out of range of the excitation and sensor windings, both these in phase and quadrature phase components are zero. As the stylus 5 is brought closer to the PDA 5, these voltages increase. At this stage, any phase difference between the excitation frequency and the resonant frequency of the resonator is constant. This is illustrated in FIG. 5 by the initial straight line portion of the plot at 81. However, as the resonant stylus comes closer to the surface of the LCD 3, the magnetic screen 21 has a detuning effect on the stylus which causes its resonant frequency to decrease which in turn results in a change in the phase angle ø. This detuning is illustrated in FIG. 5 by the initial curved portion 83 of the plot. In the plot shown in FIG. 5, the point 85 represents the point when the resonant stylus 5 is brought into contact with the LCD 3. As will be explained in more detail below, when pressure is applied to the tip of the stylus, the resonant frequency of the stylus changes. This changes the in phase and quadrature phase components and causes the plot to follow the curved path to point 87. Therefore, by thresholding the ratio of the in phase component and the out of phase component, a determination can be made as to whether or not there is a "pen-down" of the resonant stylus. However, careful consideration must be taken when determining the threshold to use, since tilting the stylus relative to the surface of the LCD 3 also causes detuning and hence a change in the phase angle ø.

Figure 6:
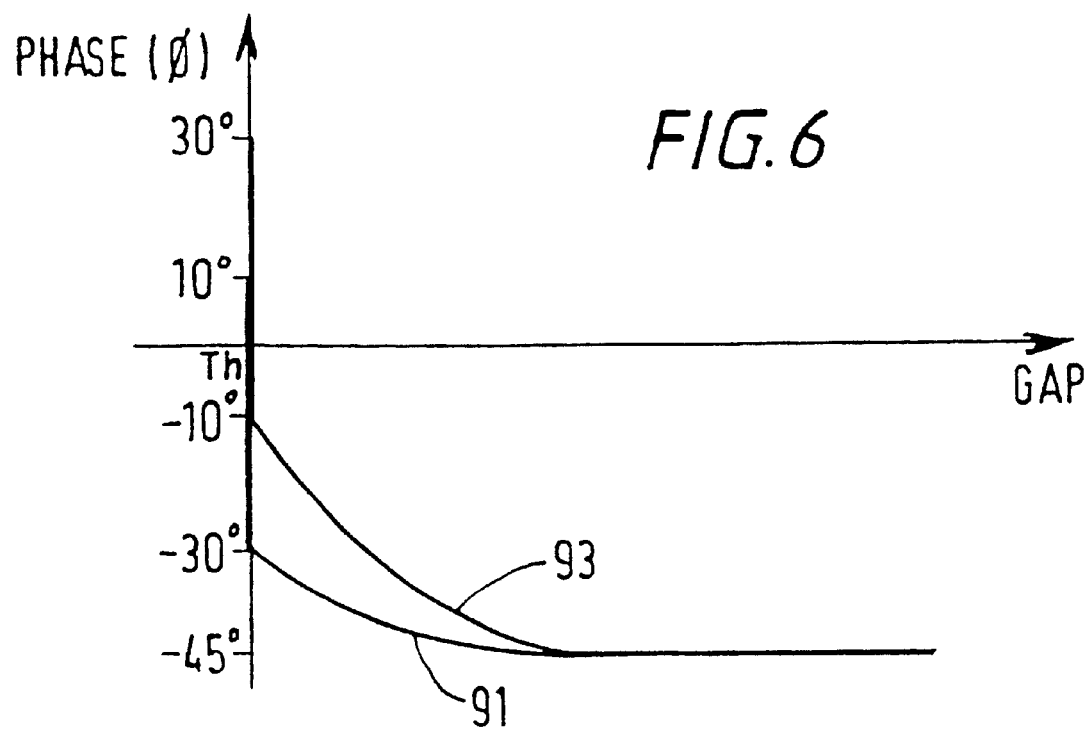
FIG. 6 is a plot illustrating the way in which the electrical phase of the signal generated by the resonant stylus changes with the gap between the stylus and the surface of the liquid crystal display for different stylus tilts relative to the liquid crystal display.

FIG. 6 shows two plots 91 and 93 which illustrate the way in which the phase shift ø changes with the gap between the resonant stylus and the liquid crystal display for different stylus tilts. In particular, curve 91 shows the way in which the phase shift ø varies with this gap when the longitudinal axis of the stylus is perpendicular to the surface of the liquid crystal display and curve 93 illustrates this variation when the stylus is tilted at an angle. As shown in FIG. 6, for large gaps, the phase shift ø in both cases is constant (in this embodiment at approximately −45°). However, as the gap reduces, the detuning effect of the magnetic shield 21 changes the phase shift ø until the gap is zero when the stylus is brought into contact with the surface of the LCD 3. As shown in FIG. 6, when the vertically held stylus is brought into contact with the LCD display (but when there no pressure applied to the tip), the phase shift ø is −30°, whereas for the tilted stylus it is −10°. When pressure is applied to both styluses, the phase shift ø changes from −30° to +10° for the vertically held stylus and from −10° to +30° for the tilted stylus. As shown in FIG. 6, in this embodiment, a threshold of approximately 0° is set so that "stylus down" will be detected regardless of whether or not the stylus is held vertically or at an angle to the LCD display. More specifically, in this embodiment, a threshold band having an upper threshold value and a lower threshold value is used, with the upper threshold value being used to detect stylus down and the lower threshold value being used to detect stylus up. As those skilled in the art will appreciate from FIG. 6, in order to be able to detect the stylus down, there must be a minimum phase change which will ensure that the phase shift passes through the threshold. Whilst this can be achieved by ensuring a very large change in resonant frequency, this is not preferred, since this will reduce the signal levels output from the integrators because of the mismatch between the resonant frequency and the excitation frequency. Further, if the phase shift ø changes upon stylus down to +90° then, at this point, there will be no in phase signal component. Therefore, the change in frequency preferably keeps the phase shift below 45°. This therefore defines a maximum frequency shift.

Returning to FIG. 3, after the digital processing and signal generation unit 59 has determined the current x-y position of the resonant stylus and determined whether or not the stylus has been brought into contact with the LCD 3, it outputs this information to the PDA electronics through the interface unit 77. This information is then used by the PDA electronics to control information displayed on the LCD 3 and the PDA's mode of function. In this embodiment, the digital processing and signal generation unit 59 is operable to perform the above calculations approximately 100 times per second when the stylus is in the vicinity of the PDA. However, when the system detects that the stylus is not present, it initially enters a standby state in which the above excitation and processing is performed approximately 20 times per second. After a predetermined length of time in this standby state, the system enters a sleep state in which the above calculations are performed approximately 2 times per second. Once the presence of the stylus is detected again, the processing resumes at the 100 times per second rate.

A brief description has been given above of the way in which the digitiser system of the present embodiment determines the x-y position of the resonant stylus relative to the sensor windings. The particular form of excitation and sensor windings used and the particular resonant stylus used in this embodiment will now be described in more detail.

Digitiser Windings

FIG. 7a illustrates the form of the excitation winding 29 used in this embodiment. The winding 29 is formed by five turns of rectangular conductor on each side of the sensor PCB 13 which are connected in series at through holes or vias, some of which are labelled 97. In FIG. 7a, the conductors on the top layer of the sensor PCB 13 are shown as solid lines whilst those on the bottom layer of the sensor PCB are shown as broken lines. FIG. 7a also shows the two connection pads 101 and 103 used to connect the ends of the excitation winding 29 to the excitation driver 51. As shown, the excitation winding 29 extends from connection pad 103 and follows an increasing rectangular spiral pattern which is alternately wound on the top layer and then the bottom layer of the sensor PCB 13 until the excitation winding 29 reaches the other connection pad 101. As shown in FIG. 7a, since the connection pads 101 and 103 are on the top layer of the sensor PCB 13, the tracks of the excitation winding 29 which are in the vicinity of the connection pads 101 and 103 are provided on the bottom side of the sensor PCB 13 only. As a result, the spacing between the tracks in this portion of the sensor winding is smaller. In this embodiment, the excitation winding 29 is wound around the outside of the sensor windings (not shown). As a result of the rectangular shape of the excitation winding 29, the electromagnetic field which it generates when the excitation current is applied to it, is substantially homogenous in the centre of the board in both the x- and y-direction but increases towards the edge of the board where the excitation windings are located. However, as those skilled in the art will appreciate, this variation does not matter because it cancels in the ratiometric arc tangent calculation performed by the processing electronics.

Figure 7B:
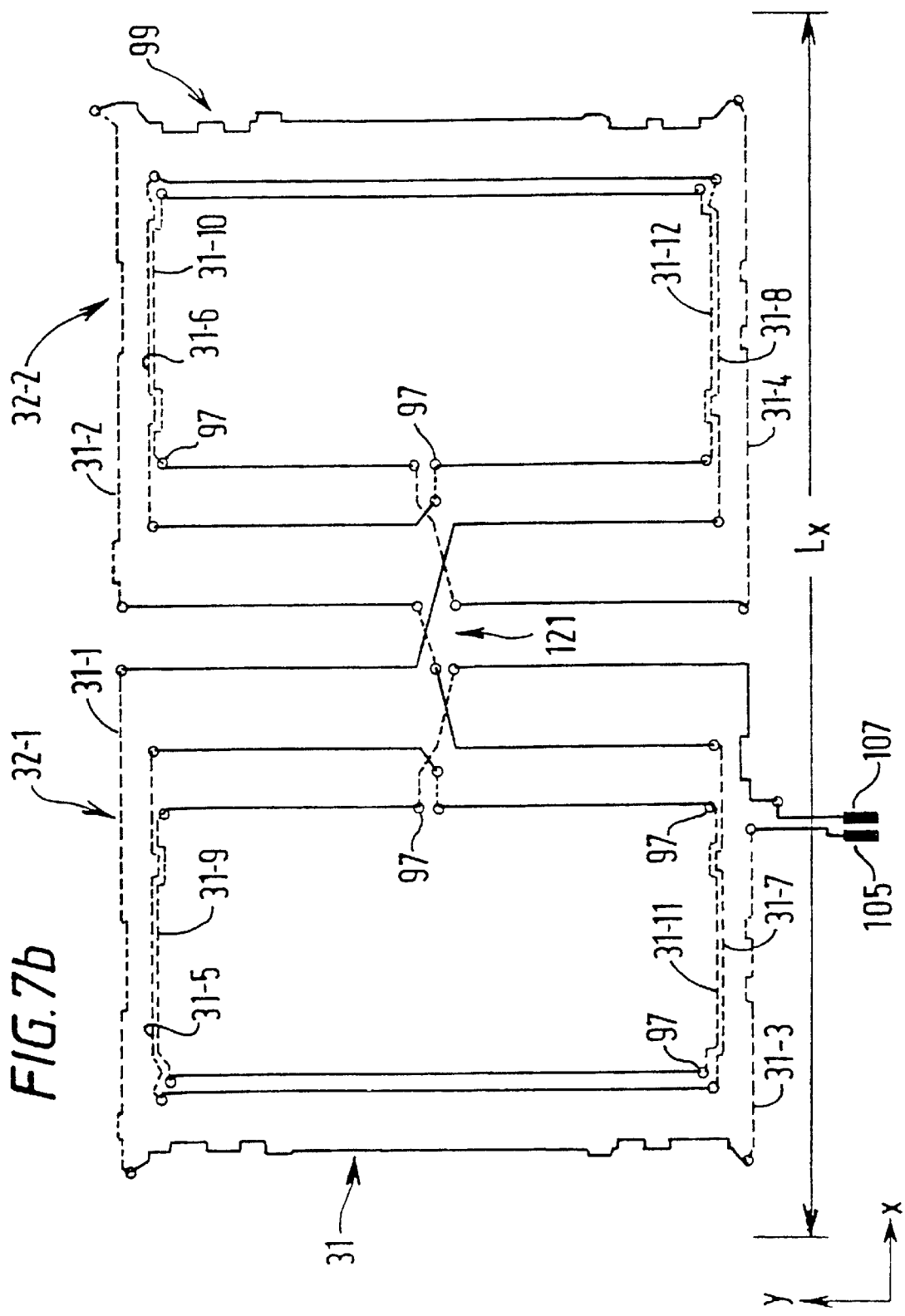
FIG. 7b illustrates the form of a sin x sensor winding of the digitising system which forms part of the personal digital assistant shown in FIG. 1.

FIG. 7b shows the printed conductors which form the sin x sensor winding 31. Again, the printed conductors on the top layer of the sensor PCB 13 are shown as solid lines whilst those on the bottom layer are shown as dashed lines. As shown, the conductor tracks which extend substantially in the y-direction are provided on the top layer of the sensor PCB 13 and those which extend substantially in the x-direction are provided on the bottom layer of the sensor PCB 13 and the ends of the conductor tracks on the top layer are connected to the ends of the conductor tracks on the bottom layer at the via holes, some of which are labelled 97. FIG. 7b also shows the two connection pads 105 and 107 which are provided for connecting the sin x sensor winding 31 to the digitiser electronics. As those skilled in the art will appreciate, the indentations in some of the conductor tracks which extend in the x- and y-directions, such as at 99, are provided in order to route the conductor track past via holes used to connect conductor tracks of the other sensor windings.

As shown, the conductor tracks of the sin x sensor winding 31 are connected to form two sets of loops 32-1 and 32-2 which are arranged in succession along the x-direction, with each loop extending along the x-direction and being connected in series so that an electromotive force (EMF) induced in loops of the same set by a common background alternating magnetic field add together and so that EMFs induced in the first set of loops 32-1 by a common background alternating magnetic field oppose the EMFs induced in the second set of loops 32-2. As shown, in this embodiment, there are three loops in each set of loops 32-1 and 32-2 and each set of loops is arranged to enclose a similar area. Therefore, any EMFs induced in the loops of the first set 32-1 by such a background magnetic field will substantially cancel out with the EMFs induced in the loops of the second set 32-2. However, as those skilled in the art will appreciate, if a point magnetic field source (or something similar such as the resonant stylus) is moved across the sensor winding 31, then the magnetic coupling between the point source and the sensor winding 31 will vary with the x-position of the point source. There will be little or no variation with the y-position, except at the edges near the conductor tracks that extend in the x-direction. As a result of the "figure-of-eight" connection between the two sets of loops 32-1 and 32-2, this variation with x-position can be approximated to be sinusoidal. As those skilled in the art will appreciate, this variation can be made more sinusoidal by the appropriate positioning, in the x-direction, of the conductor tracks of the sensor winding 31 which extend in the y-direction. As explained in the applicant's earlier International Application PCT/GB99/01638 this is because unwanted spatial harmonic components of the variation can be removed by the appropriate placement of these conductor tracks. The reader is referred to this earlier International Application for further details of this harmonic suppression technique. As those skilled in the art will appreciate, it is because of this approximate sinusoidal variation that the signal induced in the sensor winding 31 by the resonant stylus 5 has a peak amplitude which approximately varies as the sine of the x-position of the stylus 5.

FIG. 7c shows the printed conductors which form the cos x sensor winding 33. Again, the printed conductors on the top layer of the sensor PCB 13 are shown as solid lines whilst those on the bottom layer are shown as dashed lines. As with the sin x sensor winding 31, most of the conductor tracks which extend in the y-direction are provided on the top layer of the sensor PCB 13 and most of those which extend in the x-direction are provided on the bottom layer of the sensor PCB 13 and the ends of the conductor tracks on the top layer are connected to the ends of the conductor tracks on the bottom layer at the via holes, some of which are labelled 97. FIG. 7c also shows the two connection pads 109 and 111 which are provided for connecting the cos x sensor winding 33 to the digitiser electronics.

As shown, the conductor tracks of the cos x sensor winding 33 are connected to form three sets of loops 34-1a, 34-2 and 34-1b which are arranged in succession along the x-direction, with each loop extending along the x-direction and being connected in series so that an EMF induced in loops of the same set by a common background alternating magnetic field add together and so that EMFs induced in the first and third set of loops 34-1a and 34-1b by a common background alternating magnetic field oppose the EMFs induced in the second set of loops 34-2. As with the sin x winding, there are three loops in each set of loops and the loops in the second set of loops are arranged to enclose a similar area to the combined area enclosed by the loops in the first and third set of loops. As a result, EMFs induced in the loops by a background magnetic field will substantially cancel out with each other. However, as with the sin x sensor winding, when the resonant stylus 5 is moved across the sensor winding 33, the magnetic coupling between the resonant stylus 5 and the cos x sensor winding 33 varies with the x-position of the stylus 5. As a result of the alternating sense of conductor loops, this variation with x-position can be approximated to be sinusoidal. However, since the sets of loops of the cos x sensor winding 33 are shifted in the x-direction by a quarter of the winding pitch ($L_x$), the sinusoidal variation will be in phase quadrature to the variation of the sin x sensor winding 31. As a result, the signal induced in the sensor winding 33 by the resonant stylus 5 has a peak amplitude which apprly varies as the cosine of the x-position of the stylus 5.

FIGS. 7d and 7e show the printed conductors which form the sin y sensor winding 35 and the cos y sensor winding 37. As shown in these figures, these sensor windings are similar to the sin x and cos x sensor windings except they are rotated through 90°. As shown in FIGS. 7d and 7e, the sin y sensor coil 35 shares the connection pad 107 with the sin x sensor winding 31 and the cos y sensor winding 37 shares the connection pad 111 with the cos x sensor winding 33. FIG. 7f shows the top layer of printed conductors and FIG. 7g shows the bottom layer of printed conductors of the sensor PCB 13 which together form the excitation winding 29 and the sensor windings 31, 33, 35 and 37. In the circuit board shown in FIG. 7, the conductor tracks have a width of approximately 0.15 mm and the minimum gap between adjacent tracks is approximately the same. Although it is possible to employ finer tracks and gap distances on the PCB, this increases cost due to additional manufacturing precision and lower manufacturing yields.

Design of Sensor Winding

As those skilled in the art will appreciate, the design of the sensor windings is one of the most critical aspects of the digitiser. The design involves, for a given area of printed circuit board, maximising the digitising area and accuracy of and the signal levels from the sensor windings. As will be apparent to those skilled in the art, the critical aspect of the x-direction sensor windings 31 and 33 are the x-positions of the conductor tracks of the windings 31 and 33 which extend in the y-direction. Similarly, the critical aspect of the design of the y-position sensor windings 35 and 37 is the y-position of the conductor tracks of the windings 35 and 37 which extend in the x-direction. In the following discussion, these conductors will be referred to as the primary sensing conductors and the tracks which connect the ends of these primary sensing conductors to other primary sensing conductors will be referred to as the connecting conductors.

The first task in designing the sensor windings is to identify the desired x-position of the primary sensing conductors for the x-position sensor windings 31 and 33 and the desired y-position of the primary sensing conductors of the y-position sensor windings 35 and 37. In this embodiment, this is achieved by arranging the primary sensing conductors to have approximately a sinusoidal density along the x- or y-direction respectively, in order to achieve the required sin/cos sensitivity. In this embodiment, in order to maximise the extent of accurate y-direction position sensing, the connecting conductors of the sin x and cos x sensor windings 31 and 33 (conductors 31-1 to 31-12 and 33-1 to 33-14) are placed within the outermost primary sensing conductors of the sin y and cos y sensor windings 35 and 37 (conductors 35-1 and 35-2 and 37-1 and 37-2 respectively). This is illustrated in FIGS. 7f and 7g. The alternative of placing the connecting conductors of the x-direction sensor windings beyond the outermost primary sensing conductors of the y-direction sensor windings would result in a reduced extent of accurate y-direction position sensing, and hence a greater "deadband" of unsensed area at the top of the PCB sensor board 13. This is a problem where space is critical, such as in the hand-held PDA system of the present embodiment. As shown in FIG. 7g, the connecting conductors of the sin x sensor winding 31 (conductors 31-1 to 31-12) are interleaved with the connecting conductors of the cos x sensor winding 33 (conductors 33-1 to 33-14) and they are placed between the other primary sensing conductors of the sin y and cos y sensor windings. When choosing which of the sin x and cos x conductor tracks to place in the outermost position, priority is preferably given to the outer turns, since these are the most sensitive to the resonator magnetic field.

Another novel aspect of the design of the sensor windings in this embodiment is the way in which the loops of each set of loops of each sensor winding are connected together. In the system previously proposed by the applicant in WO98/58237, the loops of each set of loops of a sensor winding were formed by providing a continuous decreasing spiral of conductor track and the two sets of loops are then connected by connecting the ends at the inside of the two spiral wound conductor tracks. In the case of the prior art "sin" sensor winding, the connection required to connect from the inside of one spiral winding to the inside of the other spiral winding requires an additional connecting conductor at the side of the sensor PCB 13 and in the case of the prior art "cos" sensor winding, requires two additional connecting conductors at the side of the sensor PCB. Since these additional connecting conductors require additional rows, these prior art sensor windings require excessive space at the sides of the PCB and therefore reduces the area coverage for a given size of circuit board. Additionally, these additional connecting conductors disturb the spacing between the other connecting conductors and causes the sensor windings' sensitivity to magnetic field from the resonant stylus to be less sinusoidal in the vicinity of the connecting conductors, thereby causing signal-to-noise and offset difficulties.

In the design of the sensor windings shown in FIG. 7, the connection between the turns or loops is made by cross-connections (such as at 121 shown in FIG. 7b) in the central region of the sensor PCB 13. As shown in FIGS. 7b to 7e, the cross-connections are made with conductors on opposite sides of the two-layer sensor circuit board 13. They cause minimal disruption to the sin/cos sensitivity of the sensor windings to the resonator magnetic field because the cross-over region is small and the two sets of conductors involved run close to each other, creating spurious fields that substantially oppose one another. Using this novel design approach, the position of the crossover regions is not critical. This therefore enables all of the sensor windings to be connected in such a manner on a double-sided PCB without clashes, as illustrated in FIG. 7.

Figure 8A:
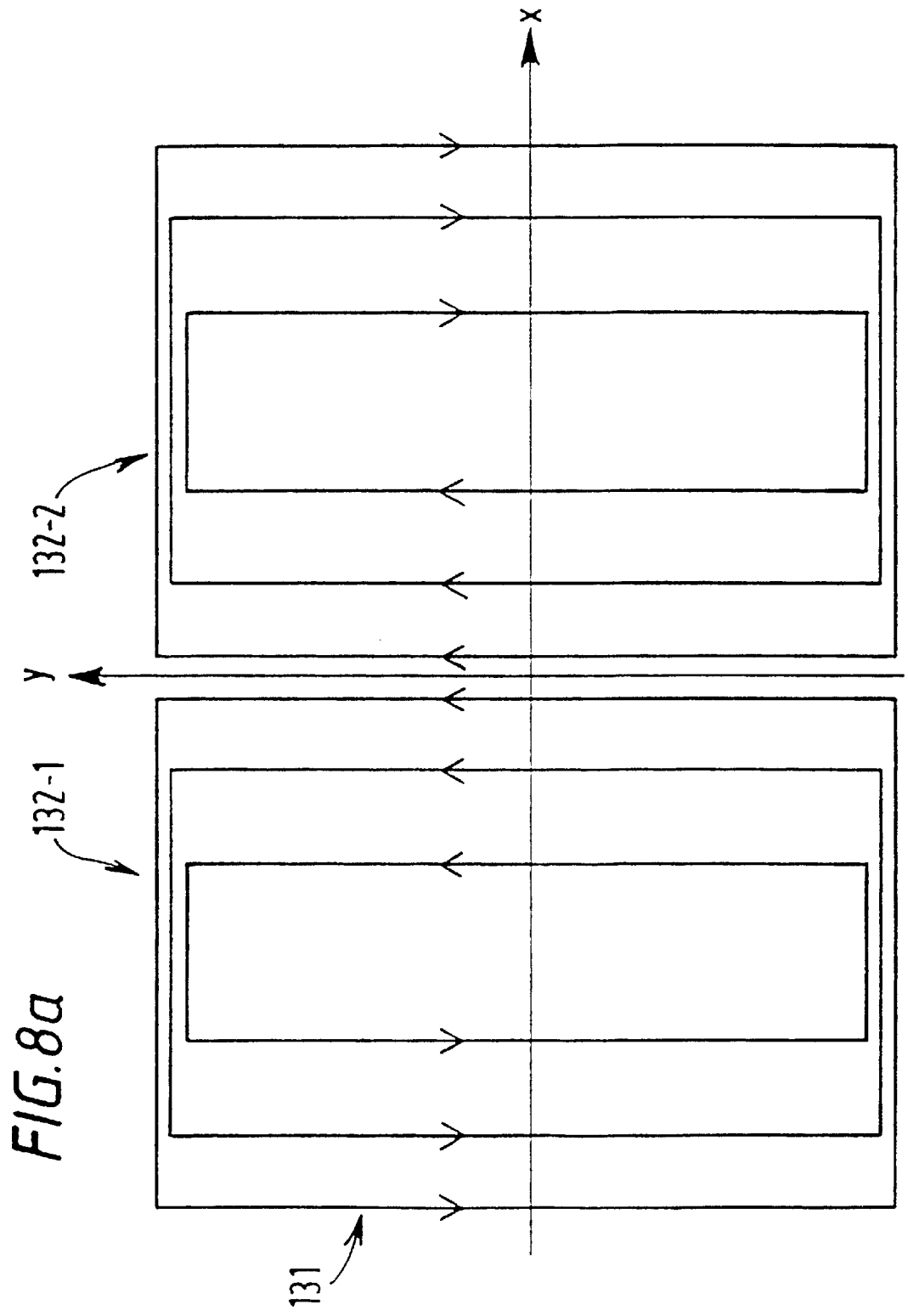
FIG. 8a shows an ideal but impractical form of the sin x sensor winding which the winding shown in FIG. 7b approximates.
Figure 8C:
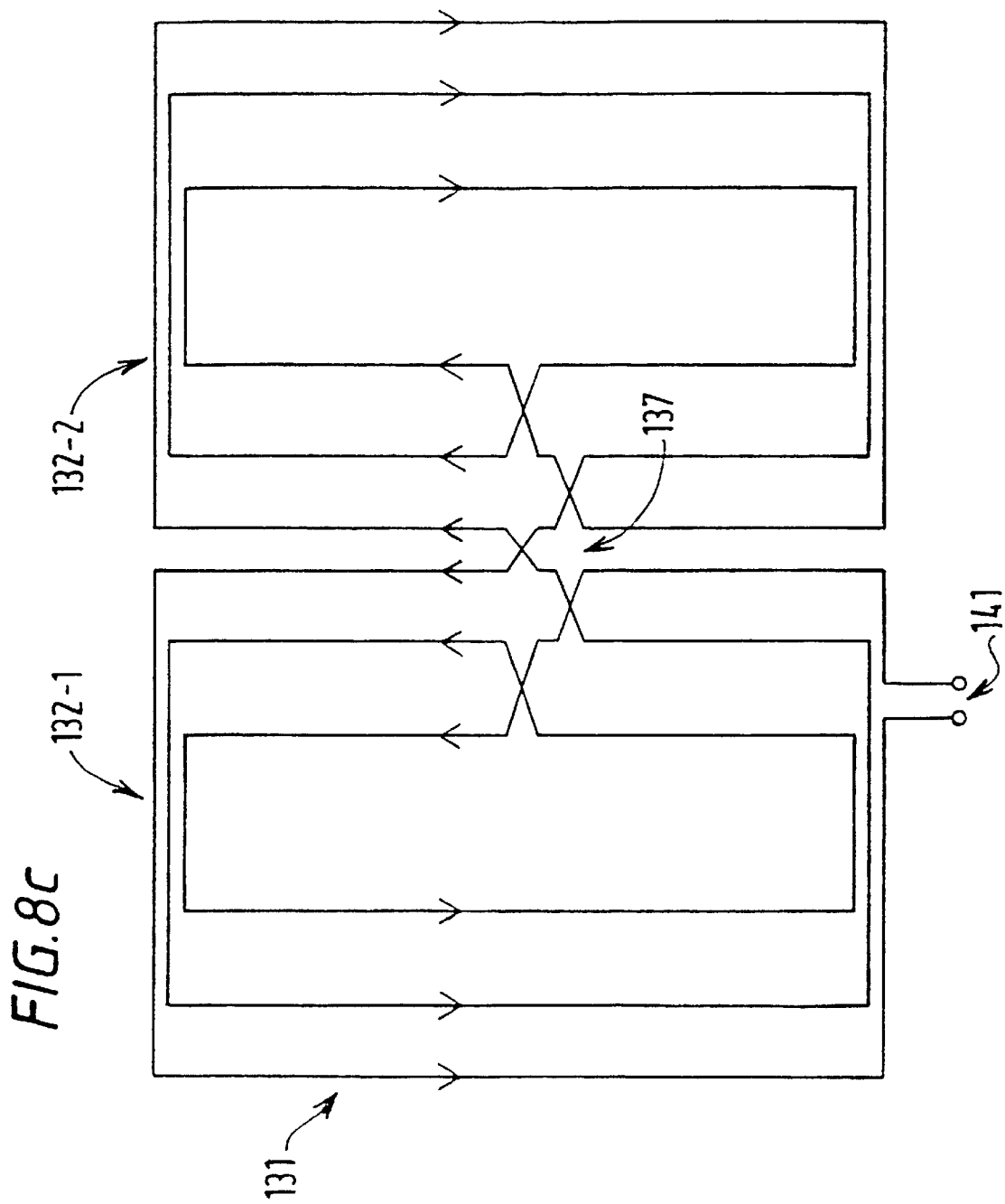
FIG. 8c illustrates the way in which a number of cross-over connections can be added to the impractical winding shown in FIG. 8a to form a practical sensor winding similar to the winding shown in FIG. 7b.
Figure 12A:
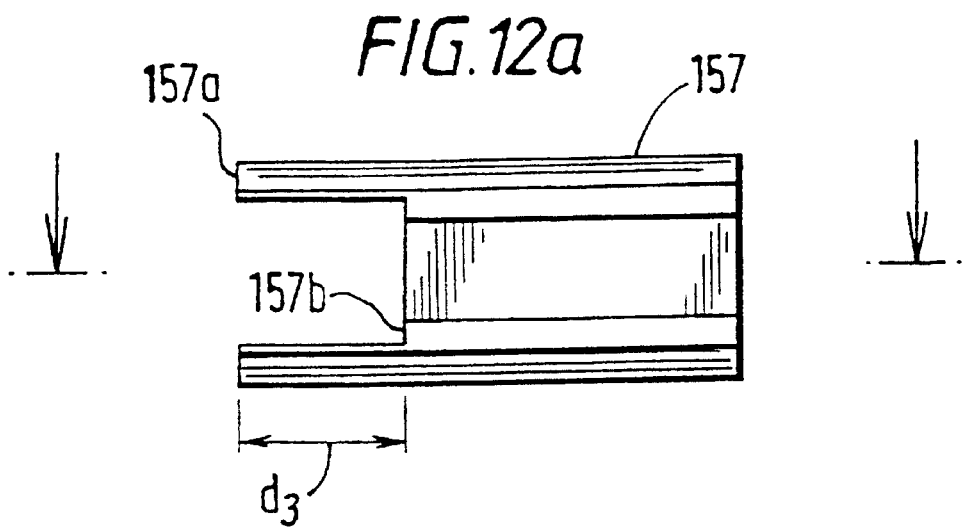
FIG. 12a is a top view of a second movement-limiting member which forms part of the resonant stylus.
Figure 12B:
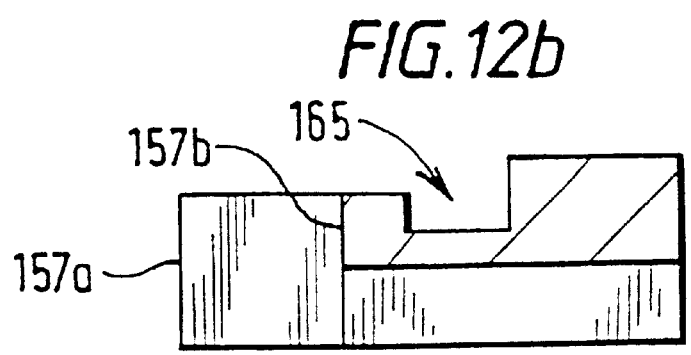
Figure 12C:
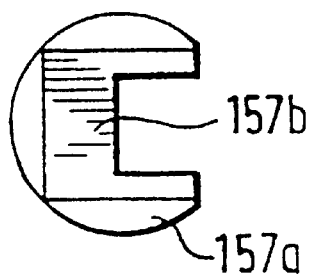
FIG. 12c is an end view of the second movement-limiting member seen from one end thereof.
Figure 12D:
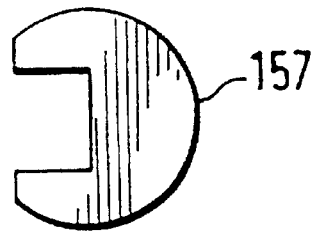
FIG. 12d is an end view of the second movement-limiting member viewed from the other end thereof.

FIG. 8 illustrates the way in which a sin x sensor winding 131 and a cos x sensor winding 133 similar to those shown in FIGS. 7b and 7c are designed. Initially, the required number of loops within each set of loops is determined. As mentioned above, and as shown in FIG. 8, in this embodiment there are three loops in each set of loops 132-1 and 132-2. It is then important to identify the direction of current flow within each loop which will provide the sinusoidal sensitivity of the winding to the resonator magnetic field and which will minimise any coupling with the excitation winding. This is achieved by ensuring that the direction of current flow is the same in the loops of the same set and opposite to the direction of current flow in the loops of the adjacent set. This is shown in FIG. 8a for the sin x sensor winding and in FIG. 8b for the cos x sensor winding. Once the primary sensing conductors (the conductors extending in the y-direction of the windings shown in FIGS. 8a and 8b) have been located at the appropriate positions along the x-direction, the loops are connected in series by making appropriate cross-connections 137 and 139 and appropriate connection terminals 141 and 143 are provided so that the windings can be connected to the processing electronics. This is illustrated in FIGS. 8c and 8d for the sin x and cos x sensor windings shown in FIGS. 8a and 8b. As those skilled in the art will appreciate, connections 141 and 143 to the sensor windings can be made from almost any point on the sensor PCB 13 without significant disturbance, since the conductors of each sensor winding run over the entire surface area of the PCB 13. This contrasts with the prior art systems that use arrays of parallel loop coils (such as those described in U.S. Pat. No. 4,878,553), where long runs of connecting conductors are required to make connection to all the loops coils.

These additional connecting conductors take up space on the circuit board and are also susceptible to spurious electromagnetic interference.

Stylus

The stylus of the present embodiment overcomes a number of problems with previous styluses which have been proposed and is more suited to low cost volume manufacture and low power operation. It is also sufficiently compact for space critical applications such as the hand-held PDA of the present embodiment. Further, its characteristics remain stable over long time periods and are insensitive to temperature variations. As mentioned above, the resonant stylus 5 in this embodiment comprises a resonant circuit 41 which includes an inductor coil 45 and a capacitor 43. The resonant stylus is also designed so that the resonant frequency of the resonant circuit 41 changes when the tip of the stylus is brought down into contact with the writing surface of the digitising system. The particular structure of the resonant stylus used in this embodiment which achieves these functions will now be described with reference to FIGS. 9 to 14. The description of the stylus will also highlight a novel design which automatically compensates for tilt of the stylus caused by the user holding the stylus in a comfortable writing position.

FIG. 9a shows an exploded view of the components of the resonant stylus 5 used in this embodiment. As shown, the stylus comprises a stylus body 151 comprising a hollow front body portion 152 (shown in cross-section in FIG. 10a) and a hollow rear body portion 154 (shown in cross-section in FIG. 10b), which houses: the resonant circuit comprising the inductor coil 45 and the capacitor 43; a 2 mm diameter ferrite rod 153; a first movement-limiting member 155 (shown in more detail in FIG. 11); a second movement-limiting member 157 (shown in more detail in FIG. 12); a nib 159; and a spring 163.

FIG. 9b shows the assembled stylus 5 in cross-section. The stylus 5 is assembled by soldering the capacitor 43 (which in this embodiment is a surface mount capacitor) to the ends of the inductor coil 45 and covering the connections with a conformal coating (not shown) to ensure that the stylus will still operate if it gets damp in use. The nib 159, which in this embodiment is made from acetal, is then pushed over one end of the ferrite rod 153. The coil 45 is then fitted over the ferrite rod 153 and then the first movement-limiting member 155 is pushed over the free end of the ferrite rod 153. The second movement-limiting member 157 is then assembled together with the first movement-limiting member 155 and the capacitor 43 is placed in a recess 165 in the second movement-limiting member 157. This assembly is then placed into the front body portion 152 and the spring 163 is placed into the rear body portion 154. A neck 166 of the rear body portion 154 is then push fit into the front body portion 152, thereby pushing the ferrite assembly into the front body portion 152. Glue may be added to the joint between the front body portion 152 and the rear body portion 154 in order to hold the components together.

Referring to FIGS. 9 to 12, when assembled, the front face of the coil 45 (face 45*a* which faces the nib 159) abuts against a shoulder 167 of the front body portion 152 and the rear face of the coil 45 (face 45*b* which faces the spring 163) abuts against a first front face of the second movement-limiting member 157 (face 157*a* which faces the nib 159). The rear face of the second movement-limiting member 157 (face 157*b* which faces the spring 163) abuts against the front face (face 154*a*) of the rear body portion 154 (face 154*a* which faces the nib 159). In this way, the inductor coil 45 and the second movement-limiting member 157 are fixed in position with respect to the stylus body 151, with, in this embodiment, the coil 45 being positioned towards the rear face of the ferrite rod 153 (face 153*a* which faces the spring 163).

The nib 159, the ferrite rod 153 and the first movement-limiting member 155 are slidably mounted within the stylus body 151 and spring biased (by spring 163) towards the front end 161 of the front body portion 152. The movement of the ferrite assembly in this direction is, however, limited by the abutment of a front face of the first movement-limiting member 155 (face 155*a* which faces the nib 159) with the rear face 45*b* of the inductor coil 45. When pressure is applied to the nib 159 of the stylus against the biasing force of the spring 163, the ferrite assembly moves towards the rear body portion 154 until the rear face of the first movement-limiting member 155 (face 155*b* which faces the spring 163) abuts against a second front face of the second movement-limiting member (face 157*b* which also faces the nib 159). As shown in FIG. 9*b*, the ferrite assembly can, therefore, only move a predetermined distance ($d_0$) (referred to hereinafter as the click distance) when pressure is applied to the end of the nib 159. This movement increases the distance $d_1$ between the rear face 153*a* of the ferrite rod and the rear face 45*b* of the inductor coil 45. As those skilled in the art will appreciate, this causes an increase in the inductance of the coil 45 due to greater coupling between the ferrite rod 153 and the coil 45, which in turn gives rise to a decrease in the resonant frequency of the resonant circuit. The exact change in the resonant frequency depends, not only on the click distance $d_0$ but also on the initial value of $d_1$, before the nib 159 is pressed and on the clearance between the windings of the inductor coil 45 and the ferrite rod 153.

Users of the stylus usually desire the click distance $d_0$ to be as small as possible, for example less than 0.5 mm, so that the stylus' writing action is as similar to a conventional pen as possible. Therefore, it is important to design the rest of the stylus to ensure that the desired frequency change is achieved with such a small click distance.

Figure 13:
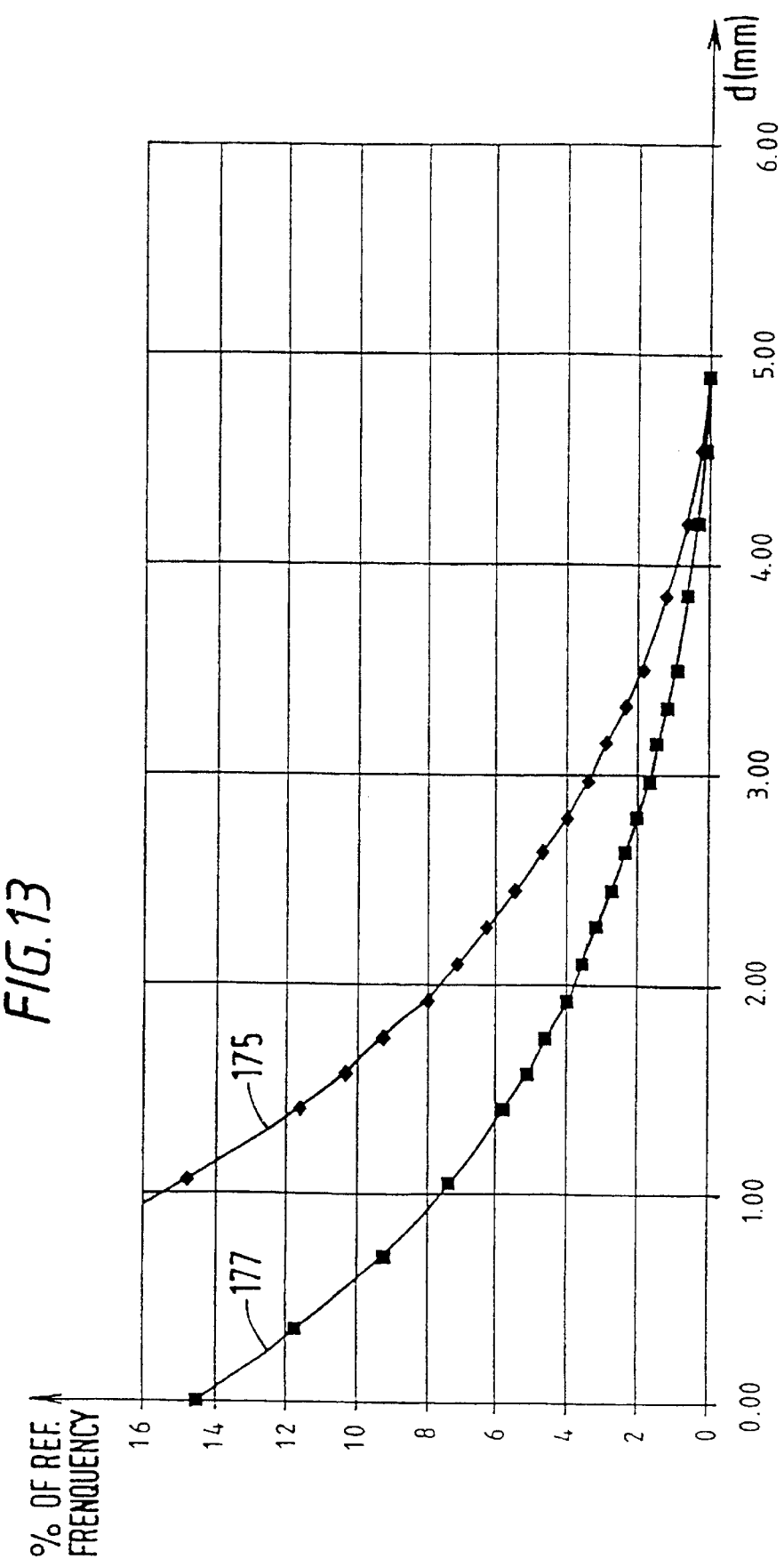
FIG. 13 is a plot illustrating the way in which a change in the resonant frequency of the resonant stylus varies for different distances between a coil which forms part of the resonant stylus and a ferrite core which moves relative to the coil.

FIG. 13 is a Cartesian plot showing the way in which the resonant frequency changes with the distance $d_1$ for different clearances between the coil windings and the ferrite rod. In particular, plot 175 shows the way in which the resonant frequency changes with distance $d_1$ when there is a small clearance between the windings of the coil 45 and the ferrite rod 153 whilst plot 177 shows the way in which the resonant frequency changes with distance $d_1$ when there is a larger gap between the windings of the coil 45 and the ferrite rod 153. As shown in FIG. 13 excessive clearance between the windings of the coil 45 and the ferrite rod 153 increases the required click distance $d_0$ to achieve a predetermined frequency change (dF) required by the overall digitising system to ensure reliable detection. Although it is possible to compensate for this by adding further coil windings, this is not preferred, since this would increase the coil's diameter or length, which are both undesirable as the stylus diameter should be minimised and excessive coil length has further consequennsequences including a reduction in the obtained change of frequency (dF) for the click distance $d_0$.

Therefore, in this embodiment, the inductor coil 45 is manufactured as a self-bonded winding. As a result, it does not need a coil former and the ferrite rod slides inside the coil 45 directly. The extra diameter for a coil former would decrease the performance as described above. In this embodiment, the coil 45 is made of standard self-bonding enamelled grade I copper wire. As those skilled in the art will appreciate, the combination of the hard ferrite rod 153 and soft wire and coating is ideal for wear resistance.

As those skilled in the art will appreciate from the plot shown in FIG. 13, in order to ensure that the resonant frequency of the stylus when the nib 159 is not pressed and the change in the resonant frequency when the nib 159 is pressed, are tightly controlled, both the initial value of $d_1$ and the change in $d_1$ (i.e. $d_0$) must be tightly toleranced. In this embodiment, apart from the resonator elements and the spring, all of the remaining parts of the stylus are made in an injection moulding process for low cost manufacture. The initial value of $d_1$ is determined by the first movement-limiting member 155 and in particular by the depth ($d_h$) of the hole 181 in the face 155*a*. Since this first movement-limiting member 155 is made by injection moulding, it is possible to hold a tight diameter tolerance for the hole 181 (in order to ensure a tight interference fit with the ferrite rod 153) and to achieve a tight tolerance on the depth $d_h$. This depth is set to the required initial distance $d_1$ so that when the nib 159 is not pressed, the spring 163 presses the front face 155*a* of the first movement-limiting member against the rear face 45*b* of the coil 45, so that the ferrite rod 153 protrudes the exact initial distance $d_1$ required. Additionally, in this embodiment, the connections from the coil 45 to the capacitor 43 are taken from the front face 45*a* of the coil to ensure that the rear face 45*b* of the coil is less flawed and provides a more reproducible end stop for the first movement-limiting member 155. This therefore ensures that the initial resonator frequency can be accurately and repeatably set.

As shown in FIG. 9*b* and as discussed above, the first movement-limiting member 155 slides within the second movement-limiting member by the click distance $d_0$ when the nib 159 is pressed. As can be seen from FIG. 9*b*, this click distance $d_0$ is therefore defined by the distance $d_2$ shown in FIG. 11*a*, between the front face 155*a* and the rear face 155*b* of the first movement-limiting element 155 and the distance $d_3$ shown in FIG. 12*a*, between the first front face 157*a* and the second front face 157*b* of the second movement-limiting member 157. Again, because both of these elements are manufactured using an injection moulding process, these dimensions can be accurately controlled because the critical dimensions are formed by a single part of each injection moulding tool. It is much more difficult to control in a cheap and reliable manner dimensions that are determined by parts of the injection moulding tool that move relative to one another in the moulding process, because it is difficult to make the tool close to exactly the same position for each part. In addition, the temperature of the tooling may vary between moulding operations which can also cause poor tolerances. Further, the critical faces 157a and 157b and faces 155a and 155b are also relatively close together in the mould compared to the click distance $d_0$. Therefore, the effect of thermal expansion or shrinkage in the moulding tool is less significant than if the distances were greater.

The first and second movement-limiting members 155 and 157 should be made from a material with similar coefficients of thermal expansion, so that the click distance $d_0$ remains approximately constant with temperature. In systems where a high level of thermal stability of the click distance $d_0$ is required, then the second movement-limiting member should have a slightly lower coefficient of thermal expansion than that of the first movement-limiting member because distance $d_3$ is slightly greater than distance $d_2$. In this way, the click distance $d_0$ can be well controlled and since the initial value of $d_1$ is also well controlled, the resonator frequency shift dF will also be well controlled.

In this embodiment, the initial value of the distance $d_1$ when no pressure is applied to the nib, is approximately 2.3 mm. When pressure is applied, this changes $d_1$ by 0.3 mm. As shown in plot 175 of FIG. 13, this results in a downward frequency change of approximately 1.5%. As described above, the downward frequency shift is suited to a system employing a permeable magnetic screen, since this also has the effect of decreasing the resonant frequency of the stylus and therefore, the two effects do not partially cancel each other out. If the stylus was designed so that pressure on the nib of the stylus resulted in an increase in the resonant frequency, then a larger frequency shift would be necessary in order to ensure reliable detection, since the amount of detuning due to the screen is not constant.

Stylus Tilt Insensitivity

As mentioned above, one of the problems with x-y digitising systems which use styluses is that a positional error is introduced into the measurements if the stylus is tilted relative to the sensor windings. The prior art systems to date have tried to measure the tilt and then compensate for it. This measurement of the tilt requires additional components and calculation which adds to cost and complexity. The novel solution presented below compensates for stylus tilt inherently, and requires no additional components or processing. Simply stated, the applicant has found that for periodic windings, such as the sensor windings described above with reference to FIG. 7, by locating the magnetic centre of the ferrite rod and resonator combination approximately one spatial radian (relative to the period of the sensor windings) from the desired measurement point of the stylus, compensates for the tilt of the stylus. In this embodiment, where the sin/cos pitch for the x- and y-directions is different, the length of the ferrite rod which achieves this is approximately a quarter of the average pitch (i.e. $[L_x+L_y]/8$). The reason for this will now be explained.

FIG. 14 schematically illustrates a stylus 205 which is tilted by angle $\alpha_x$ to the direction which is normal to the plane of the LCD display 3 and the plane of the sensor board 13. As shown in FIG. 14, the stylus 205 includes an elementary magnetic field emitter 211 which has a magnetic centre on the axis 215 of the stylus 205 and which emits a magnetic field along the axis 215. The signal levels induced in the sin x and cos x sensor windings on the sensor PCB 13 by this magnetic field emitter 211, after demodulation and ignoring the exponential terms, are:

$$\sin\_x\_I = \frac{A\tau}{2}\sin\left[\frac{2\pi x_p}{L_x} - \alpha_x\right] \quad (9)$$

$$\cos\_x\_I = \frac{A\tau}{2}\cos\left[\frac{2\pi x_p}{L_x} - \alpha_x\right] \quad (10)$$

where $x_p$ is the x position corresponding to the magnetic centre of the magnetic field emitter element 211. As shown in FIG. 14, the magnetic centre is displaced along the stylus axis 215 by a distance $l_1$. Therefore, the x position of the tip of the stylus ($x_{tip}$) is related to $x_p$ by:

$$x_p = x_{tip} + l_1 \sin \alpha_x \quad (11)$$

Therefore, if $l_1$ is made equal to $L_x/2\pi$, then the apparent position of the element calculated by the processing electronics will be approximately $x_{tip}$ as required. This is because the other term approximately cancels out since $\alpha_x$ is approximately equal to $\sin \alpha_x$. Although this approximation is only mathematically true for small angles $\alpha_x$, the inventors have found that this approximation does work in practice for much larger tilt angles of up to approximately $\pm 45°$. Therefore, the position that the sensor electronics calculates from the arc tangent calculation is approximately the stylus tip position independent of the tilt angle $\alpha_x$.

This illustrates that a small coil or wound ferrite at a predetermined distance (in this embodiment approximately 10 mm) from the stylus tip will result in the required tilt insensitivity. However, this is not an optimum system since a long ferrite element is preferable to concentrate the magnetic field. Additionally, the ferrite should extend closer to the stylus tip (and hence the sensor board) in order to increase the signal levels induced in the sensor windings. Using a ferrite rod that extends from a position close to the stylus tip along the axis of the stylus and whose effective average position is $l_1$ (not necessarily a simple average, but considering all field effects) solves these problems. The inventors have found through experimentation, that the ferrite rod should be approximately a quarter of the sensor winding's pitch to achieve the desired result.

As those skilled in the art will appreciate, the length of the ferrite rod can be modified in order to change the apparent position so that it does not correspond to the tip of the stylus. For example, the ferrite rod may be shortened in order to approximate to the intersection point of the stylus axis and a plane between the stylus tip and the sensor board (for example the upper surface of a display device or the effective plane of the pixels).

As those skilled in the art will appreciate, the above stylus has a number of advantages over the prior art styluses which operate in a similar way, such as those described in U.S. Pat. No. 5,565,632. These include:

(i) The ability to reliably and repeatedly define an initial resonant frequency of the resonant stylus, the click distance and the change in resonant frequency caused by pressure applied to the nib.

(ii) The ability to ensure that the click distance $d_0$ is thermally stable.

(iii) The stylus is particularly resistant to shock since the ferrite rod is a simple component without holes or other features that are potential areas for crack initiation. When dropped on the nib, the shock of the impact is carried along the length of the ferrite rod. The main areas of concern from a cracking point of view are the ends of the rod. In this embodiment, the ends of the ferrite rod are pushed into tight-fitting plastic parts that hold them in compression. Ceramic materials such as ferrite and other similar magnetic materials are more resistant to shock when in compression. The use of a simple cylindrical ferrite rod also reduces manufacturing cost due to its simple shape. It also makes it possible to hold a very tight diameter tolerance and a relatively tight length tolerance. The diameter tolerance is important because the ferrite rod is designed to run freely inside the coil but without excessive clearance.

(iv) The inductor coil is relatively short compared to the length of the ferrite rod and is positioned at the far end away from the nib. This gives a large $dF/dd_1$ quantity, which is desirable to minimise the click distance $d_0$ for a required change in frequency dF. A longer coil or a coil that is closer to the nib would give rise to a lower $dF/dd_1$ and the click distance $d_0$ would have to be increased for a desired frequency change dF. This coil position also enables the diameter of the stylus to taper towards the nib, giving an improved feel to the pen for the user. If the coil were closer to the nib the tapering would not be possible due to reduced plastic wall thickness.

(v) The stylus design uses a convention metal biasing spring 163 of relatively large size. This makes it easier to achieve a low actuation force for the nib which gives the pen a quality feel. This also means that the user does not need to press hard onto the writing surface which in this embodiment is the surface of the LCD which could be damaged by excessive force.

(vi) The inductor coil of the resonant circuit needs to be wound so that the number of turns is constant. This results in a relatively constant resonant frequency when the coil is used in conjunction with the ferrite rod and the capacitor. However, since the wire diameter of the coil may vary, the winding length of the inductor coil may also vary if the number of turns is constant. However, this variation in the length of the inductor coil will be compensated for by the sliding interference fit arrangement of the rear body portion with the front body portion of the stylus, since the rear body portion slides into the front body portion until it sandwiches the coil between the front body portion and the second movement-limiting member.

(vii) The second movement-limiting member 157 fits over the first movement-limiting member 155 which facilitates assembly. However, in spite of the asymmetry inherent in this design, the final stylus appears symmetric to the user because the nib 159 is constrained to move only along the longitudinal axis of the stylus body 151.

(viii) Since the nib 159 is relatively sharp and tapered, this allows the user to be able to use the stylus at an angle which is the normal writing style of most users. This is difficult to achieve since it is important that the ferrite rod 153 be as close as possible to the nib end. If it is not, then the pen would require a shorter ferrite rod 153 in order to achieve the same system tilt insensitivity discussed above. However, shortening the ferrite rod decreases the resonant circuit's effective magnetic cross-section and Q-factor, both of which result in reduced signal levels which results in poorer system performance. The design shown above in FIG. 9 shows how the ferrite rod can be placed near to the nib end.

(ix) The stylus design described above is relatively tolerant to ferrite rod length variations. The tightly toleranced initial value of $d_1$ and the click distance $d_0$ are set by components at the far end of the inductor coil 45 away from the nib 159. If the rod length varies, then it will simply alter the axial position of the nib 159. However, the nib 159 is free to move over a significant axial distance without constraint. The effective magnetic centre of the magnetically coupled resonant circuit in the stylus remains at a relatively constant position from the nib's tip in spite of different rod lengths. This is due to the ferrite rod being pushed fully into the nib against an end stop, whatever the length of the rod. The position of the nib end of the ferrite rod relative to the nib influences the position of the device's effective magnetic centre more strongly than its opposite end. The position of the effective magnetic centre of the stylus is usually set so that the indicated position is the centre of the nib tip's radius, when used in conjunction with the sensor windings discussed above.

(x) Since the initial resonant frequency of the resonator is well toleranced and the change in frequency is also well toleranced, there is no need to spread the energy of the excitation signal over a relatively wide band of frequencies (for example either by reducing the number of transmit pulses or by transmitting at different narrow-band frequencies) to ensure that the signals received back from the resonator are large enough for position measurement. Therefore, the system is more power efficient which results in longer battery life for the hand-held PDA.

Modifications and Alternative Embodiments

In the above embodiment, a hand-held personal digital assistant has been described which includes an x-y digitising tablet which operates with a resonant stylus. Various novel features of the digitiser windings and of the stylus have been described which make the system suited for such low cost high volume applications. The skilled reader will appreciate that many of the novel aspects of the system described are independent of each other. For example, the stylus described above can operate with the prior art digitiser windings described in U.S. Pat. No. 4,878,553 or WO98/58237 and the digitiser windings described above can operate with the prior art stylus, such as those described in U.S. Pat. No. 5,565,632, or with any other prior art magnetic field generating or altering device.

A number of modifications and alternative embodiments will now be described.

As mentioned above, the design of the sensor windings is one of the most critical aspects of the digitiser and involves maximising the digitising area of the sensor windings. Each of the sensor windings can be divided into a number of primary sensing conductors and connecting conductors which connect the primary sensing conductors to each other. With the three turn sensor windings described above, these connecting conductors required five rows of conductor track at the edges of the sensor PCB. FIG. 15a schematically illustrates the loops of a sin x sensor winding 231 in which the connecting conductors for the inner loops 233 and 235 are interlaced between the connecting conductors for the outer loops 237 and 239 and 241 and 243 respectively. As those skilled in the art will appreciate, if the winding shown in FIG. 15a is superimposed over the cos x winding illustrated in FIG. 8b, only four rows of connecting tracks are required at each side of the sensor PCB. This interlacing therefore reduces the space required for these connecting tracks and therefore reduces the "deadband" at the side of the sensor PCB. As those skilled in the art will appreciate, rather than interlacing the connecting tracks for the sin x sensor winding, this interlacing can be performed on the cos x sensor winding, as illustrated in FIG. 15b for the cos x sensor winding 245. Further, as those skilled in the art will appreciate, a similar interlacing technique can be performed on the y-position sensor windings.

The above embodiment has described a hand-held personal digital assistant which employs a digitising system which is embedded behind the LCD of the device. As those skilled in the art will appreciate, the digitising system described above can be used for various applications. It is particularly useful, however, for low cost high volume consumer products such as PDAs, web browsers and mobile telephones and the like. FIG. 16 illustrates the way in which a mobile telephone 251 may be adapted to include a liquid crystal display 255 and underneath the display an x-y set of digitiser windings such as those described above which are operable to sense the position of a resonant stylus 257. The digitising system may be used to allow the user to create, for example, short text messages which can then be sent by the mobile telephone to another party. If the mobile telephone includes, for example, an organiser, then the digitiser can be used to control the inputting, manipulation and outputting of data from the organiser.

In the first embodiment, the digitiser system employed a number of sensor windings, an excitation winding and a resonant stylus. In an alternative embodiment, rather than using a resonant stylus, a stylus having either a short-circuit coil or a magnetic field concentrator (such as a piece of ferrite) could be used. However, in such embodiments, lower signal levels would be induced in the sensor windings and the system could not operate in the pulse-echo mode of operation since the non-resonant elements do not continue to "ring" after the excitation signal has ended. In a further alternative embodiment, rather than using a passive stylus, a powered stylus could be used with the sensor windings discussed above. In this case, since the stylus has power to generate its own magnetic field, there is no need for the excitation winding, although it may still be provided in order to give a phase reference signal to the stylus. The power to the stylus may be provided either by a battery contained within the stylus or by connecting the stylus, via a lead, to a power source. As those skilled in the art will appreciate, whilst such powered stylus embodiments are possible, they are not preferred since they increase the cost of the stylus and/or they require a lead to the stylus which interferes with the normal use of the device by the user.

In the above embodiment, the stylus employed an inductor coil formed from self-bonding copper wire and did not have a former. As discussed above, this provides the advantage that the gap between the ferrite core and the windings of the coil can be made very small. As those skilled in the art will appreciate, this benefit will still arise if a thin former, made for example, from paper or plastic is used rather than the conventional relatively thick former traditionally employed. The term "formerless coil" in the appended claims is intended to cover such alternatives.

In the above embodiment, a single resonant stylus was provided. As those skilled in the art will appreciate, the system may operate with multiple styluses having different resonant frequencies. Each stylus may then be assigned a different function in the system.

In the stylus of the above embodiment, the ferrite rod always protrudes from the rear face of the inductor coil by a distance greater or equal to the initial value of $d_1$. If the inductor coil is not in near contact with the ferrite rod, then $dF/dd_1$ would be smaller and therefore the initial value of $d_1$ would need to be reduced to the point where it is no longer possible to attach the first movement-limiting member to the ferrite rod, unless the coil also surrounds the end of the first movement-limiting member. However, this would increase the diameter of the coil further or would require the ferrite rod to be modified to a non-cylindrical form, thereby increasing cost and fragility.

In the above embodiment, the movement-limiting members were arranged to the rear of the inductor coil. Whilst it is possible to place the movement-limiting members in front of the inductor coil, towards the nib, this is not preferred, since there is less space towards the nib end for these parts. Further, whilst the biasing spring 163 has been provided towards the rear of the stylus, this may be replaced by a low force spring at the nib end of the inductor coil. However, in such an embodiment, the spring may need to be made short and therefore of an undesirably thin wire diameter to ensure a low actuation force for the nib, which adds to the component cost and assembly difficulty. Further, the use of a metal spring at the nib end may adversely interfere with the resonator's magnetics. A plastic spring arrangement could be used instead, but this is susceptible to creep over time, resulting in a loss of return force.

In the stylus of the above embodiment, the first movement-limiting member rests against the rear face of the inductor coil when there is no pressure applied to the nib of the stylus. This state defines the initial value of distance $d_1$, the distance that the ferrite rod initially protrudes from the coil. As those skilled in the art will appreciate, it is possible to use another member to define this initial value of $d_1$. However, in this case, it would be important to avoid contact between the coil and any component that holds the ferrite rod at its far end away from the nib. Since the initial value of $d_1$ is small, this holding component would have little length along the ferrite rod over which to hold it. Therefore, the ferrite rod would be difficult to hold and may require expensive manufacturing operations such as glueing.

In the stylus of the above embodiment, the length of the ferrite rod was chosen in order to reduce the effect of stylus tilt. As those skilled in the art will appreciate, it is not necessary to use a coil which has a ferrite core in order to achieve tilt insensitivity. A similar tilt insensitivity can be obtained by a suitable arrangement of coils. Again the arrangement of coils should be such that the average magnetic centre of the coils is approximately pitch/$2\pi$ from the desired apparent measurement point.

FIGS. 17a to 17d diagrammatically illustrate four alternative forms of the stylus. In particular, FIG. 17a shows the tip 159 which is mounted on the end of the ferrite core 153. FIG. 17a also shows the coil 45 through which the ferrite core 153 passes and which, in this embodiment is also fixed to the stylus housing 275. As shown, in this form of the stylus, a movement-limiting member 277 having an internal slot 279 is connected for movement with the ferrite rod 153 and is spring-biased towards the tip 159 by the spring 163. As shown, a pin 281 which is also fixed to the stylus housing is provided inside the slot 279. Therefore, in this embodiment, the length of the slot 279 defines the extent of movement of the tip 159. FIG. 17b illustrates a similar embodiment except in this case, the movement-limiting member 277 is fixed relative to the housing 275 and the pin 281 is mounted for movement with the ferrite rod which is spring-biased by the spring 163.

In the above embodiment, both the initial distance between the end of the ferrite rod and the end of the coil ($d_1$) was fixed together with the click distance ($d_0$) of the stylus.

FIG. 17c schematically illustrates an embodiment in which only the initial distance between the end of the ferrite rod and the end of the coil ($d_1$) is fixed by the central bore 283 of the movement-limiting member 285. Therefore, only the initial frequency of the resonant circuit is fixed. As those skilled in the art will appreciate, in this embodiment, the click distance is only limited by the distance that the nib can be pushed inside the stylus housing.

In the above embodiments, the ferrite core was mounted for movement with the tip and the coil was fixed to the housing. As those skilled in the art will appreciate, the stylus can operate with the ferrite core being fixed relative to the housing and the coil being mounted for movement with the tip. Such an embodiment is diagrammatically illustrated in FIG. 17d which shows that the coil 45 is mounted for movement with the tip 159 and that the ferrite core 153 is fixed to the housing 275. Various other modifications to the stylus will be apparent to those skilled in the art and will not be described further here.

In the above embodiment, a processing channel comprising two mixers and an integrator was provided for each sensor winding. In an alternative embodiment, a single processing channel may be used to process the signals induced in all the sensor windings in a time multiplexed manner. As those skilled in the art will appreciate, whilst this reduces the complexity of the processing electronics, it increases the time required to obtain a position measurement.

In the above embodiment, the sensor windings were arranged to have a sensitivity to magnetic field from the resonator which approximately varies as a single period of a sinusoid over the measurement range. As those skilled in the art will appreciate, the sensor windings may be arranged so that this sensitivity varies through multiple periods of a sinusoid. In this case, the system will have to keep track of the current period in which the resonant stylus is located. Examples of such multiperiod windings can be found in the applicant's earlier International Application WO98/58237. Another alternative is that the sensor windings are arranged so that their sensitivity to the magnetic field from the resonator varies through a fraction of a sinusoid over the measurement area. Such an embodiment is particularly useful in applications where the measurement area is rectangular, in order to ensure that the pitch of the x sensor windings and the y sensor windings are the same. As those skilled in the art will appreciate, this will improve the tilt insensitivity of the system if the stylus is designed as described above.

In the above embodiment, the excitation winding was used to energise the resonator and the signals received in the sensor windings were used to identify the resonator position. In an alternative embodiment, the sensor windings may be used to energise the resonator and the signals received on the excitation winding used to identify the location of the resonator. In such an embodiment, either the sensor windings would have to be energised in turn or if the sensor windings are energised together then separate excitation frequencies would have to be applied to each (which would require separate resonant circuits in the resonator which resonate at those frequencies) so that the processing electronics can distinguish the received signals. Alternatively still, the system could operate by energising the resonator using one of the sensor windings and then receiving the signal from the resonator on another sensor winding. The way that such a system can operate is described in the applicant's earlier International Application WO98/58237.

In the above embodiment, the excitation winding was wound around the outside of the sensor windings. In order to extend the measurement range of the sensor windings as far as possible towards the periphery of the sensor PCB, some of the turns of the excitation coil may alternatively be interlaced with the conductors of the sensor windings. This arrangement can also help maintain uniform outer coil field/sensitivity over the entire sensor board, which helps minimise the dynamic range of the sensor system and hence simplifies the design.

The sensor PCB which carries the excitation and sensor windings may be manufactured on a flexible printed circuit board. In this case, the connecting portion may be extended to form a flexible tail for connecting the coils to the processing electronics. A flexible PCB can also be used to minimise the thickness of the sensor board, e.g. to less than 0.2 mm.

As described above, each of the sensor windings comprises a number of primary sensing conductors and a number of connecting conductors for connecting the primary sensing conductors to each other. In the embodiment described above, the primary sensing conductors for the x-position sensor windings were located substantially in the y-direction whilst those for the y-position sensor windings extended substantially in the x-direction. As those skilled in the art will appreciate, this is not essential, the primary sensing conductors only have to cross the relevant measurement direction.

In the above embodiment, an electrostatic screen formed from a layer of carbon ink was provided between the sensor PCB and the backlight for the LCD. Other conductive layers may be used such as an evaporated aluminium film coating or a cross-hatched, fishbone or comb-shaped copper layer. Alternatively still, if the base of the electroluminescent backlight layer 11 can be grounded, then this can effectively act as the electrostatic screen instead.

In the above embodiment, a hand-held personal digital assistant has been described which employs a liquid crystal type display. As those skilled in the art will appreciate, the above digitiser system can be employed with other types of screen, such as TFT screens and the like.

In the above embodiment, the sensor PCB was located directly underneath the LCD of the hand-held PDA device. As those skilled in the art will appreciate, the sensor PCB does not have to be located underneath the LCD, it can, for example, be located to one side of it. However, if this is the case, then the overall size of the device will have to be larger.

In the above embodiment, each of the sensor windings was formed using three turns of conductor. As those skilled in the art will appreciate, the sensor windings can be formed using a single turn of conductor. However, this is not preferred, since the sensor winding's sensitivity to the magnetic field generated by the resonator is less sinusoidal and the signal levels output are smaller. It is therefore preferred to have as many turns as possible in the sensor windings.

In the above embodiment, the in phase and quadrature phase signals from one of the sensor windings were used to determine electrical phase information for the resonator which is indicative of the frequency difference between the excitation frequency and the resonant frequency of the resonator. In the embodiment, the excitation frequency was fixed. In an alternative embodiment, the determined electrical phase information can be used to control the excitation frequency in order to maintain a detected resonator phase at a predetermined value. The advantage of this is that it maximises the signal levels output from the integrators which are used for the position measurement calculation.

In the above embodiment, the signals induced in the sensor windings were mixed with the excitation signal and a 90° phase shifted version of the excitation signal in order to generate in phase and quadrature phase outputs, from which the electrical phase information of the resonator was determined. As those skilled in the art will appreciate, other techniques can be used in order to extract this resonator electrical phase information, such as the timing of zero crossings of the resonator signals, although this technique is not preferred because it is sensitive to noise.

In the above embodiments, two-dimensional x-y digitising systems have been described. As those skilled in the art will appreciate, some aspects of the present invention are not, however, limited to two-dimensional position encoders. In particular, some aspects of the present invention can be incorporated into a one-dimensional linear or rotary position encoder. For example, the resonant stylus described above could be used in a linear position detector.

In the above embodiments, the signals output from the sensor windings were used and position measurements were obtained by performing an arc-tangent calculation. As those skilled in the art will appreciate, it is possible to extract the position information from the received signals without performing such an arc-tangent calculation. The applicant's earlier International Application WO98/00921 or WO90/34171 disclose alternative techniques for determining the position information from the signals induced in the sensor windings.

In the above embodiments, two phase quadrature sensor windings in each of the x- and y-directions were used in order to generate signals which varied with position in phase quadrature to each other. As those skilled in the art will appreciate, this is not essential. As long as the windings are separated along the measurement axis by some non-zero or non-multiple of 180° phase shift, the signals induced in the sensor windings can be processed to extract the position information.

Various other modifications and alternative embodiments will be apparent to those skilled in the art.

What is claimed is:

1. A stylus for use with a position detector, the stylus comprising:
   an elongate housing;
   a movable tip mounted at one end of the housing for axial movement relative thereto in a first direction from a retracted position to an extended position and in a second, opposite direction from the extended position to the retracted position;
   a sensing coil fixed in the housing and having an abutment surface facing in said second direction;
   a flux linkage element mounted to the tip for movement relative to the coil; and
   movement-limiting means to define the extent of movement of the tip relative to the housing between said extended and retracted positions, said movement-limiting means comprising:
      a first limiting element mounted to the flux linkage element and having a first abutment surface facing in said first direction and a second abutment surface facing in said second direction;
      a second limiting element fixed in the housing axially adjacent to the coil and having first and second abutment surfaces facing in said first direction, the first abutment surface contacting the abutment surface of the coil; and
      the arrangement being such that when the tip is in the retracted position, the second abutment surface of the first limiting element contacts the second abutment surface of the second limiting element and when the tip is in the extended position the second abutment surface of the first limiting element contacts the abutment surface of the coil.

2. A stylus as in claim 1, wherein said flux linkage element is elongate and wherein the first limiting element comprises a blind bore of a predetermined depth for receiving and holding said elongate flux linkage element, whereby when the tip is in said extended position, the end of said elongate element is a predetermined distance from the abutment surface of said coil.

3. A stylus as in claim 1, wherein said first limiting element slides within a channel of said second limiting element.

4. A stylus as in claim 1, wherein the extent of movement of the tip is defined by the difference between the distance between the first and second abutment surfaces of said second limiting element and the distance between the first and second abutment surfaces of said first limiting element.

5. A stylus as in claim 1, wherein said first and second limiting elements are formed by an injection moulding process.

6. A stylus for use with a position detector, the stylus comprising:
   an elongate housing;
   a movable tip mounted at one end of the housing for axial movement relative thereto in a first direction from a retracted position to an extended position and in a second, opposite direction from the extended position to the retracted position;
   a sensing coil fixed in the housing and having an abutment surface facing in said second direction;
   a flux linkage element mounted to the tip for movement relative to the coil; and
   movement-limiting means to define the extent of movement of the tip relative to the housing between said extended and retracted positions, said movement-limiting means comprising a limiting element mounted to the flux linkage element and having an abutment surface facing in said first direction for contacting the abutment surface of said coil when the tip is in said extended position;
   characterised in that said flux linkage element is elongate and wherein the limiting element comprises a blind bore of a predetermined depth for receiving and holding said elongate element, whereby when the tip is in said extended position, the end of said elongate element is a predetermined distance from the abutment surface of said coil.

7. A stylus for use with a position detector, the stylus comprising:
   an elongate housing;
   a movable tip mounted at one end of the housing for axial movement between a retracted position and an extended position;
   a formerless sensing coil; and
   a flux linkage element which extends through the coil;
   wherein said formerless coil and said flux linkage element are mounted for relative movement with the movement of said tip, whereby the inductance of said coil is changed with the movement of said tip.

8. A stylus as in claim 7, wherein said flux linkage element comprises a ferrite rod.

9. A stylus as in claim 7, wherein said coil is a solenoid coil having an axis which is substantially co-axial with the axis of the housing.

10. A stylus as in claim 7, further comprising a bias operable to bias the tip towards said extended position.

11. A stylus as in claim 10, wherein said bias comprises a spring which acts against the housing and said tip.

12. A stylus as in claim 7, wherein said coil is formed by self-bonding wire.

13. A stylus as in claim 7, further comprising a capacitor connected to the ends of said coil, to form a resonant circuit.

14. A stylus as in claim 7, wherein said housing comprises a front portion and a rear portion which fit together by interference fit.

15. A stylus according to claim 7, further comprising a movement limiter which defines the extent of movement of the tip relative to the housing between said extended and retracted positions.

16. A stylus according to claim 15, wherein said movement limiter comprises a first limiting element mounted for movement with the tip and a second limiting element fixed relative to the housing.

17. A stylus according to claim 16, wherein said tip is mounted for relative movement in a first direction from a retracted position to an extended position and in a second, opposite direction from the extended position to the retracted position, wherein said first and second limiting elements comprise a first abutment surface facing in said first direction and a second abutment surface facing in said second direction and wherein the arrangement is such that when the tip is in the retracted position, the second abutment surface of the first limiting element contacts the first abutment surface of the second limiting element and when the tip is in the extended position, the first abutment surface of the first limiting element contacts the second abutment surface of the second limiting element.

18. A stylus according to claim 7 for use with a winding having a predetermined pitch, wherein the coil has an average magnetic centre which is located approximately $1/(2\pi)$ of the predetermined pitch of the winding from a desired apparent measurement point.

19. A stylus according to claim 18, wherein said desired apparent measurement point is approximately the tip of the stylus.

20. A method of detecting the position of first and second members which are relatively moveable along a measurement path, the method comprising the steps of:
providing a winding on one of said first and second members;
providing a stylus according to claim 17 on the other member;
generating a magnetic field with said stylus; and
detecting the generated magnetic field with said winding and detecting therefrom the relative position of said first and second members.

21. A method of detecting the position of first and second members which are relatively moveable along a measurement path, the method comprising the steps of:
providing a winding on one of said first and second members;
providing a stylus according to claim 7 on the other member;
generating a magnetic field with said winding; and
detecting the generated magnetic field with said stylus detecting therefrom the relative position of said first and second members.

22. A portable data input/output device comprising a stylus according to claim 7.

23. A stylus as for use with a position detector, the stylus comprising:
an elongate housing;
a movable tip mounted at one end of the housing for axial movement relative thereto in a first direction from a retracted position to an extended position and in a second, opposite direction from the extended position to the retracted position;
a sensing coil;
a flux linkage element;
wherein the sensing coil and the flux linkage element are mounted for relative movement with the movement of said tip, whereby the inductance of said coil is changed with the movement of said tip;
characterised by a movement limiter which defines the extent of movement of the tip relative to the housing between said extended and retracted positions, said movement limiter comprising a first limiting element mounted for movement with the tip and a second movement-limiting element fixed in the housing;
wherein said first and second limiting elements comprise a first abutment surface facing in said first direction and a second abutment surface facing in said second direction and wherein the arrangement is such that when the tip is in the retracted position the second abutment surface of the first limiting element contacts the first abutment surface of the second limiting element and when the tip is in the extended position the first abutment surface of said first limiting element contacts the second abutment surface of said second limiting element.

24. A stylus as in claim 23, wherein said first limiting element comprises an elongate member having a slot and said second limiting member comprises means which slides within said slot.

25. A stylus as in claim 23, wherein said flux linkage element comprises a ferrite rod.

26. A stylus as in claim 23, wherein said coil is a solenoid coil having an axis which is substantially co-axial with the axis of the housing.

27. A stylus as in claim 23, further comprising a bias operable to bias the tip towards said extended position.

28. A stylus as in claim 27, wherein said bias comprises a spring which acts against the housing and said movement limiter.

29. A stylus as in claim 23, wherein said coil is formed by self bonding wire.

30. A stylus as in claim 23, further comprising a capacitor connected to the ends of said coil, to form a resonant circuit.

31. A stylus as in claim 23, wherein said housing comprises a front portion and a rear portion which fit together by interference fit.

32. A method of detecting the position of first and second members which are relatively moveable along a measurement path, the method comprising the steps of:
providing a winding on one of said first and second members;
providing a stylus according to claim 23 on the other member;
generating a magnetic field with said stylus; and
detecting the generated magnetic field with said winding and detecting therefrom the relative position of said first and second members.

33. A method of detecting the position of first and second members which are relatively moveable along a measurement path, the method comprising the steps of:
providing a winding on one of said first and second members;

providing a stylus according to claim 23 on the other member;

generating a magnetic field with said winding; and detecting the generated magnetic field with said stylus and detecting therefrom the relative position of said first and second members.

34. A portable data input/output device comprising a stylus according to claim 23.

35. A stylus according to claim 23 for use with a winding having a predetermined pitch, wherein the coil has an average magnetic centre which is located approximately $1/(2\pi)$ of the predetermined pitch of the winding from a desired apparent measurement point.

36. A stylus according to claim 35, wherein said desired apparent measurement point is approximately the tip of the stylus.

37. A stylus for use with a position detector, the stylus comprising:

an elongate housing;

a movable tip mounted at one end of the housing for axial movement relative thereto in a first direction from a retracted position to an extended position and in a second, opposite direction from the extended position to the retracted position;

a sensing coil having an abutment surface;

a flux linkage element;

wherein said sensing coil and said flux linkage element are mounted for relative movement with the movement of said tip, whereby the inductance of the coil is changed with the movement of the tip; and movement limiter operable to limit the movement of the tip relative to the housing comprising a limiting element mounted for movement with the tip and having an abutment surface facing in said first direction for contacting the abutment surface of said coil when the tip is in said extended position;

characterised in that said flux linkage element is elongate and wherein the limiting element comprises a blind bore of a predetermined depth within said abutment surface for receiving and holding said elongate element, whereby when the tip is in said extended position, the end of said elongate element is a predetermined distance from the abutment surface of said coil.

\* \* \* \* \*

UNITED STATES PATENT AND TRADEMARK OFFICE
CERTIFICATE OF CORRECTION

PATENT NO. : 6,667,740 B2  
DATED : December 23, 2003  
INVENTOR(S) : Ely et al.

Page 1 of 3

It is certified that error appears in the above-identified patent and that said Letters Patent is hereby corrected as shown below:

Title page,  
Item [56], please add the following:  
-- References Cited, U.S. PATENT DOCUMENTS

| | | |
|---|---|---|
| 3482242 | 12/69 | Hargrove |
| 4255617 | 3/81 | Carau, Sr., et al |
| 5619431 | 4/97 | Oda |
| 4150352 | 4/79 | Pomella et al |
| 3895356 | 7/75 | Kraus |
| 4593245 | 6/86 | Vierti et al |
| 4065850 | 1/78 | Burr et al |
| 4094572 | 6/78 | Burr et al |
| 4097684 | 6/78 | Burr |
| 4642321 | 2/87 | Schoenberg et al |
| 4693778 | 9/87 | Swiggett et al |
| 4711026 | 12/87 | Swiggett et al |
| 5625239 | 4/97 | Persson et al |
| 5082286 | 1/92 | Ryan et al |
| 5088928 | 2/92 | Chan |
| 5129654 | 7/92 | Bogner |
| 5188368 | 2/93 | Ryan |
| 5381091 | 1/95 | Kobayashi et al |
| 5434372 | 7/95 | Lin |
| 2145742 | 1/39 | Wechsung |
| 2942212 | 6/60 | Mynall |
| 3219956 | 11/65 | Newell et al |
| 3297940 | 1/67 | Mulligan et al |
| 3647963 | 3/72 | Bailey |
| 3851242 | 11/74 | Ellis |
| 3898635 | 8/75 | Kulterman |
| 3906436 | 9/75 | Kurauchi et al |
| 3962663 | 6/76 | Visser |
| 4005396 | 1/77 | Fujiwara et al |
| 4081603 | 3/78 | Davis et al |
| 4092852 | 6/78 | Fowler et al |
| 4156192 | 5/79 | Schedrovitsky et al |
| 4210775 | 7/80 | Rodgers et al |
| 4341385 | 7/82 | Doyle et al |
| 4423286 | 12/83 | Bergeron |
| 4482784 | 11/84 | Whetstone |
| 4504832 | 3/85 | Conte |
| 4507638 | 3/85 | Brosh |
| 4532376 | 7/85 | Rockwell |
| 4609776 | 9/86 | Murakami et al |
| 4697244 | 9/87 | Murakami et al |
| 4709209 | 11/87 | Murakami et al |
| 4711977 | 12/87 | Miyamori et al |
| 4723446 | 2/88 | Saito et al |
| 4734546 | 3/88 | Landmeier |
| 4737698 | 4/88 | McMullin et al |
| 4786765 | 11/88 | Yamanami et al |
| 4848496 | 7/89 | Murakami et al |
| B1 4878553 | 9/97 | Yamanami et al |
| 4878553 | 11/89 | Yamanami et al |
| 4893077 | 1/90 | Auchterlonie |
| 4902858 | 2/90 | Yamanami et al |
| 4985691 | 1/91 | Pulyer et al |
| 4999461 | 3/91 | Murakami et al |
| 5013047 | 5/91 | Schwab |
| 5028745 | 7/91 | Yamanami et al |
| 5041785 | 8/91 | Bogaerts et al |
| 4891590 | 1/90 | Hammel et al |
| 3772587 | 11/97 | Ferrand et al |

UNITED STATES PATENT AND TRADEMARK OFFICE
CERTIFICATE OF CORRECTION

PATENT NO.    : 6,667,740 B2  
DATED         : December 23, 2003  
INVENTOR(S)   : Ely et al.

Page 2 of 3

It is certified that error appears in the above-identified patent and that said Letters Patent is hereby corrected as shown below:

Title page (cont'd),

| | | |
|---|---|---|
| 3812481 | 5/74 | Stednitz |
| 6124708 | 9/00 | Dames |
| 4820961 | 4/89 | McMull |
| 3812481 | 5/74 | Stednitz |
| 6124708 | 9/00 | Dames |
| 4820961 | 4/89 | McMullin |
| 4014015 | 3/77 | Gundlach |
| 5406155 | 4/95 | Persson |
| 4868443 | 9/89 | Rossi |
| 5486731 | 1/96 | Masaki et al |
| 5187389 | 1/93 | Schalk |
| 5693993 | 12/97 | Ito et al |
| 5783940 | 7/98 | Kolomeitsev |
| 2867783 | 1/59 | Childs |
| 4223300 | 4/97 | Wiklund |
| 4425511 | 1/84 | Borsh |
| 4963703 | 10/90 | Phillips |
| 5748110 | 5/98 | Sekizawa |
| 4975546 | 12/90 | Craig |
| 5815091 | 10/90 | Dames |

FOREIGN PATENT DOCUMENTS

| | | |
|---|---|---|
| 0313046 | 4/89 | Europe |
| 0554900 | 8/93 | Europe |
| WO 95/31696 | 11/95 | WIPO |
| 2042183 A | 9/80 | Great Britain |
| 2141235A | 12/84 | Great Britain |
| 0657917 A1 | 6/95 | Europe |
| 0675581 A1 | 10/95 | Europe |
| 0709648 A2 | 5/96 | Europe |
| 1452132 | 10/76 | Great Britain |
| 1604824 | 12/81 | Great Britain |
| 2012431 A | 7/79 | United Kingdom |
| 2021273 A | 11/79 | Great Britain |
| 2059593 A | 4/81 | Great Britain |
| 2064125 A | 6/81 | Great Britain |
| 2074736 A | 11/81 | Great Britain |
| 2103943 A | 3/83 | Great Britain |
| 1325017 | 3/62 | France |
| 1134848 | 8/62 | Germany |
| 3500121 A1 | 7/86 | Germany |
| 3620412 A1 | 12/87 | Germany |
| 0159191 A2 | 10/85 | European |
| 0182085 A3 | 5/86 | European |
| 0182085 A2 | 5/86 | European |
| 0209513 A1 | 6/86 | European |
| 0552001 A1 | 7/93 | European |
| 0607694 A1 | 7/94 | European |
| 0680009 A2 | 11/95 | European |
| WO 92/12401 | 7/92 | WIPO |

UNITED STATES PATENT AND TRADEMARK OFFICE
CERTIFICATE OF CORRECTION

PATENT NO. : 6,667,740 B2
DATED : December 23, 2003
INVENTOR(S) : Ely et al.

It is certified that error appears in the above-identified patent and that said Letters Patent is hereby corrected as shown below:

Title page (cont'd),

```
WO 94/25829    11/94   WIPO
WO 96/03188 A1         2/96    WIPO
851543 10/60   Great Britain
1122763        8/68    Great Britain
2682760        4/93    France
2298082        8/76    France
97/14935       4/97    WIPO
0743508 A2     11/96   Europe
WO 98/00921    1/98    PCT
0313046        4/89    Europe
0554900        8/93    Europe
```

PUBLICATIONS
PATENT ABSTRACTS OF JAPAN, Vol. 010, No. 009, (P-420), 14 January 1986 & JP 60 165512A (Toshiba KK), 28 August 1985

Klatt, "Phase of Digital Data Fixes Shaft Angle", ELECTRICAL DESIGN NEWS, Vol. 16, No. 12, 15 June 1971, pages 53-56, XP002045871

PATENT ABSTRACTS OF JAPAN, Vol. 15, No. 37 (P-1159), 29 January 1991 & JP 02 275314 A (OMRON TATEISI ELECTRON CO), 9 November 1990

PATENT ABSTRACTS OF JAPAN, Vol. 10, No. 32 (E-379), 7 February 1986 & JP 60 189231 A (MATSUSHITA DENKI SANGYO KK, 26 September 1985

McDonnel, "The Use of Inductosyn to Digital Converters in Linear Control Systems", AUTOMATION, Vol. 10, No. 11-12, November 1975-December 1975, pages 31-32

ELECTRONICS LETTERS, Vol. 11, No. 1, 9 January 1975, pages 5-6, Gordon, "Digital xy Position Indicator Using Walsh Functions Pulle et al, "A New Magnetoresistive Based Sensor for Switched Reluctance Drives" PROCEEDINGS OF THE ANNUAL POWER ELECTRONICS SPECIALISTS CONFERENCE (PECS), Toledo, June 29 - July 3, 1992, Vol. 2, No. CONF, 23, 29 June 1992, pages 839-843, INSTITUTE OF ELECTRICAL AND ELECTRONICS ENGINEERS--

Signed and Sealed this

Seventh Day of September, 2004

JON W. DUDAS
*Director of the United States Patent and Trademark Office*